May 2, 1939.  P. S. TICE  2,157,034
FUEL SUPPLY SYSTEM FOR INTERNAL COMBUSTION ENGINES
Filed Aug. 3, 1934  6 Sheets-Sheet 1
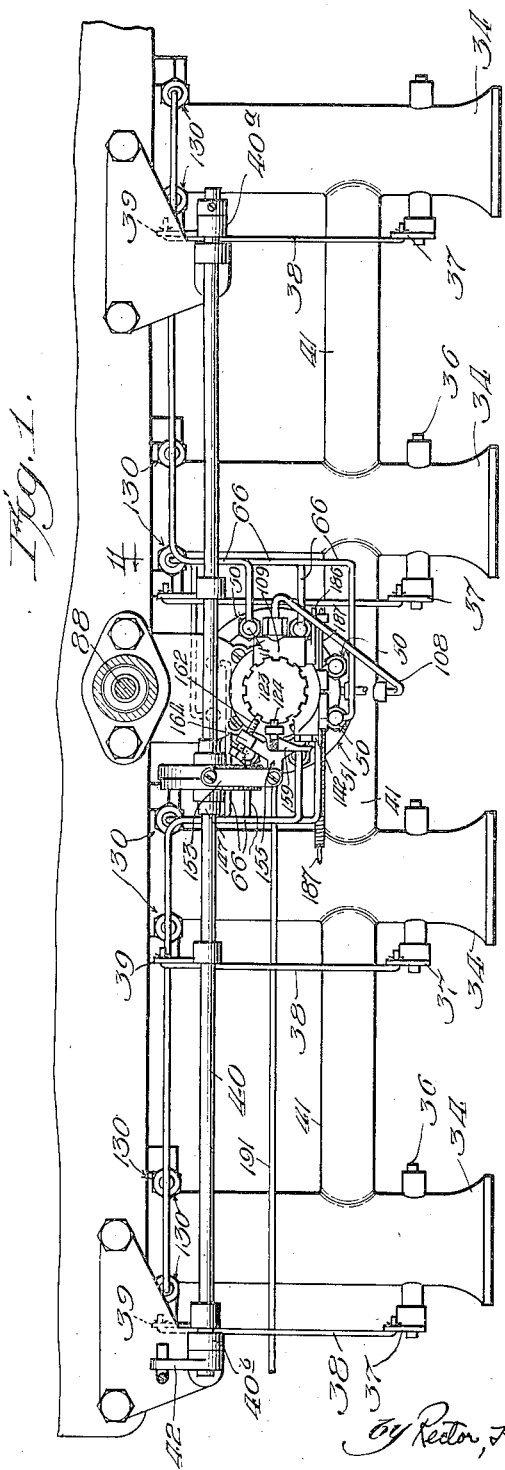
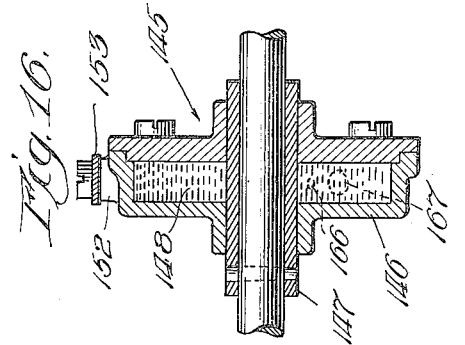
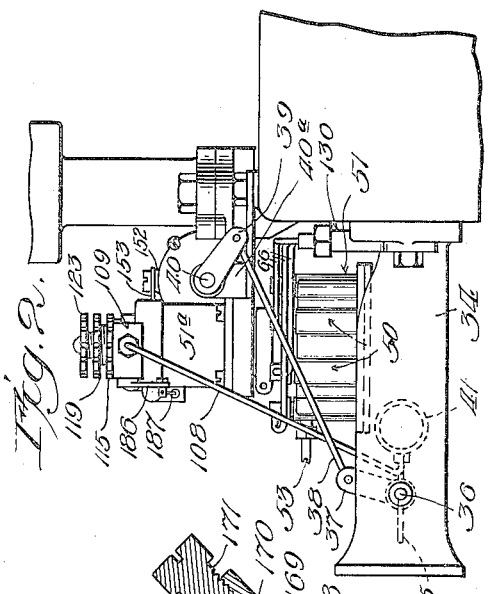
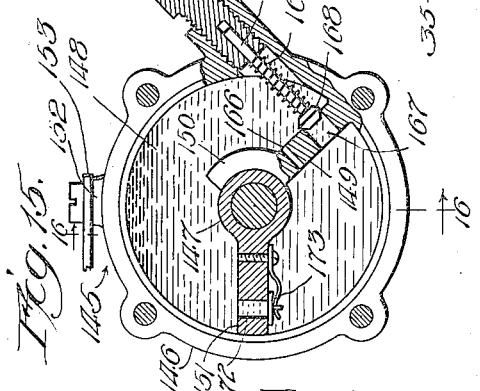
Inventor,
Percival S. Tice May 2, 1939. P. S. TICE 2,157,034
FUEL SUPPLY SYSTEM FOR INTERNAL COMBUSTION ENGINES
Filed Aug. 3, 1934 6 Sheets-Sheet 2
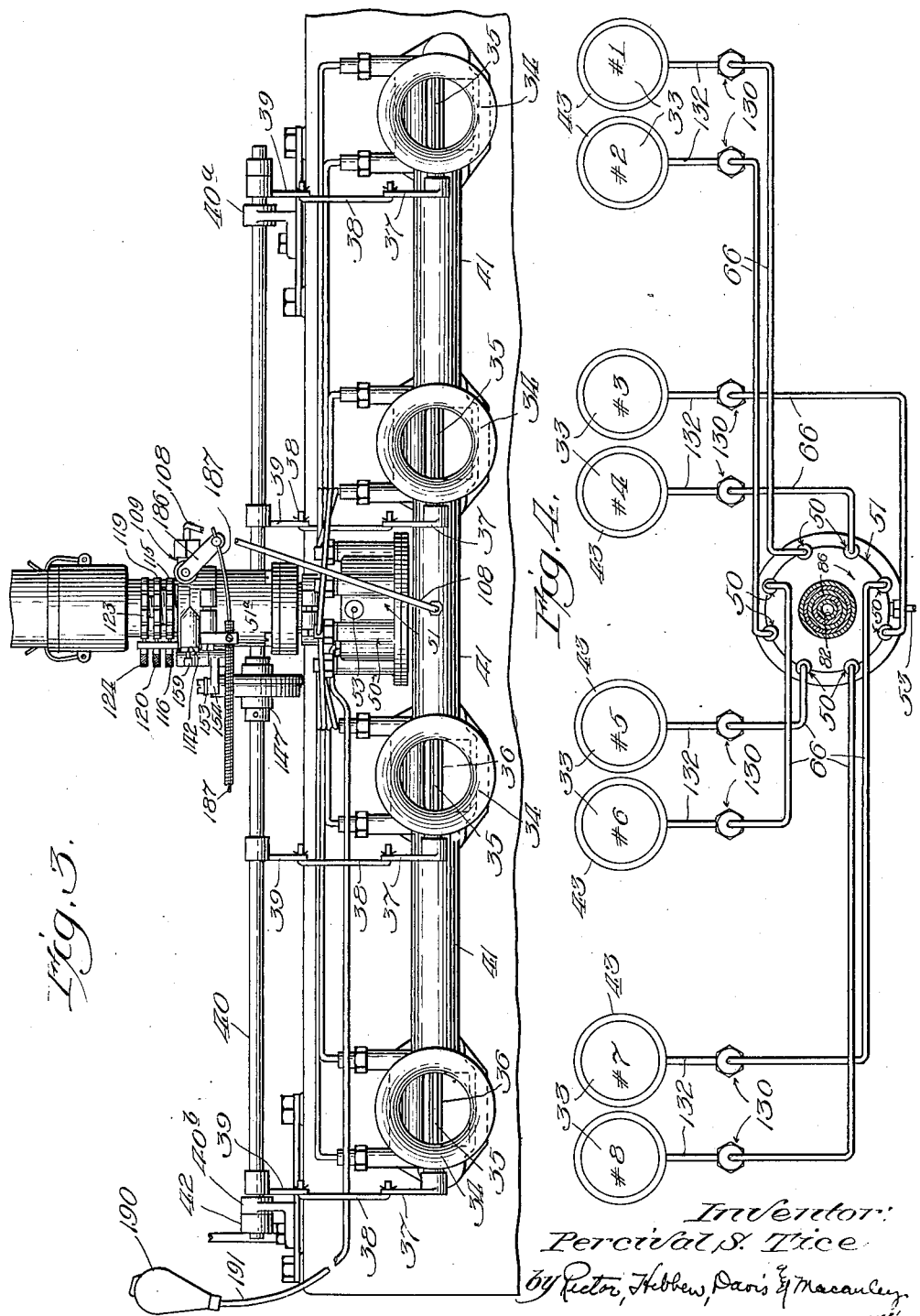
Inventor:
Percival S. Tice

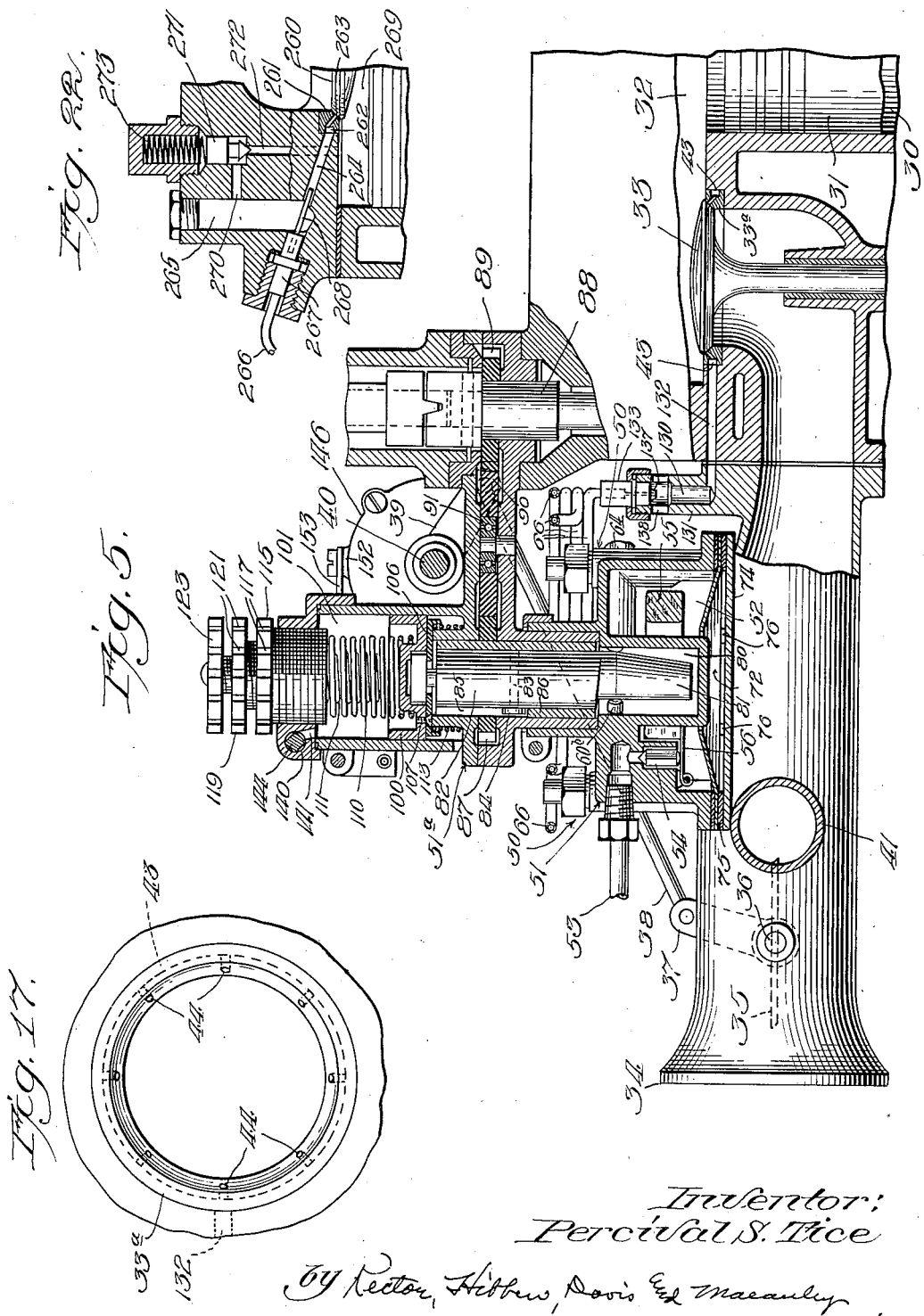

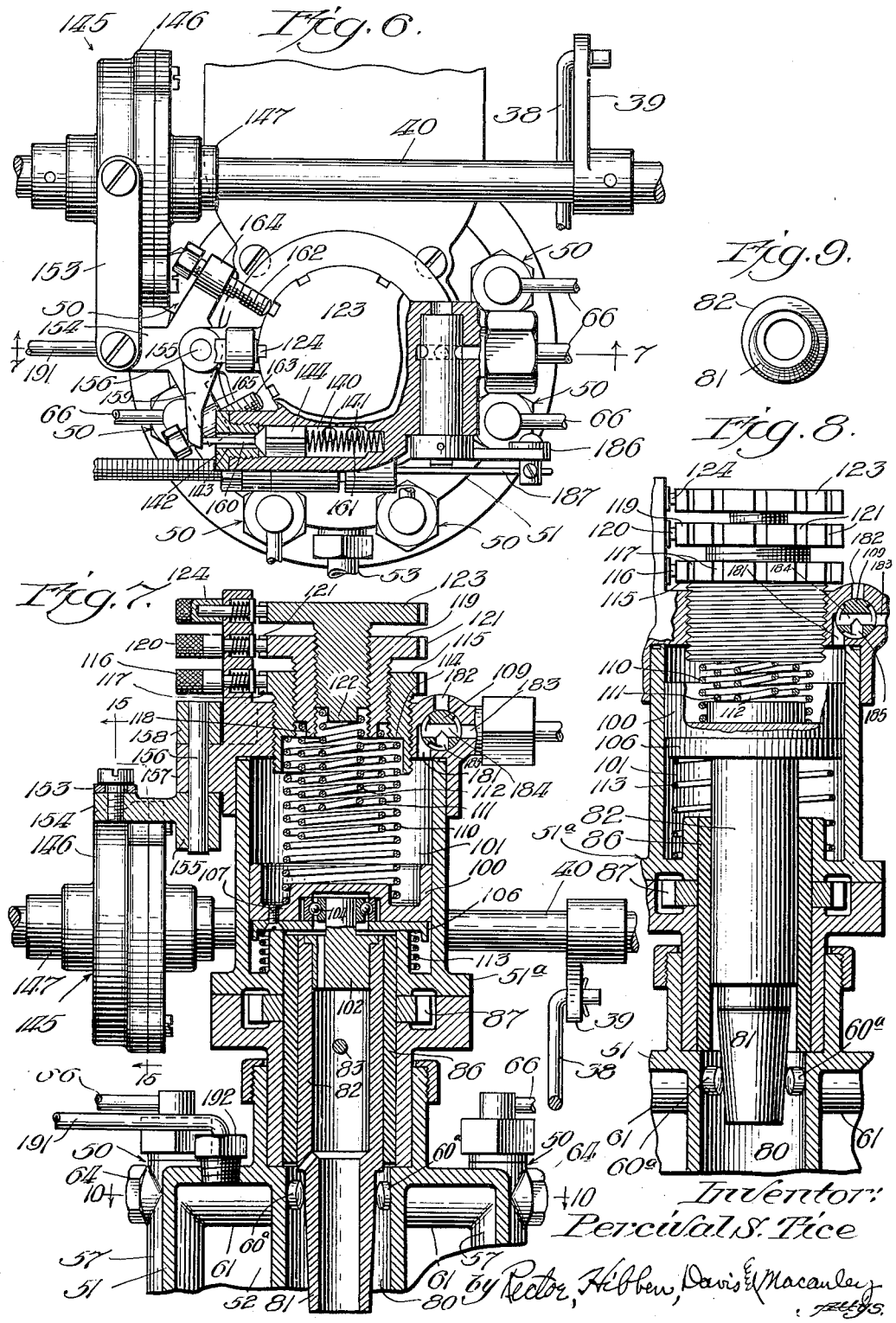

May 2, 1939.   P. S. TICE   2,157,034
FUEL SUPPLY SYSTEM FOR INTERNAL COMBUSTION ENGINES
Filed Aug. 3, 1934   6 Sheets-Sheet 5
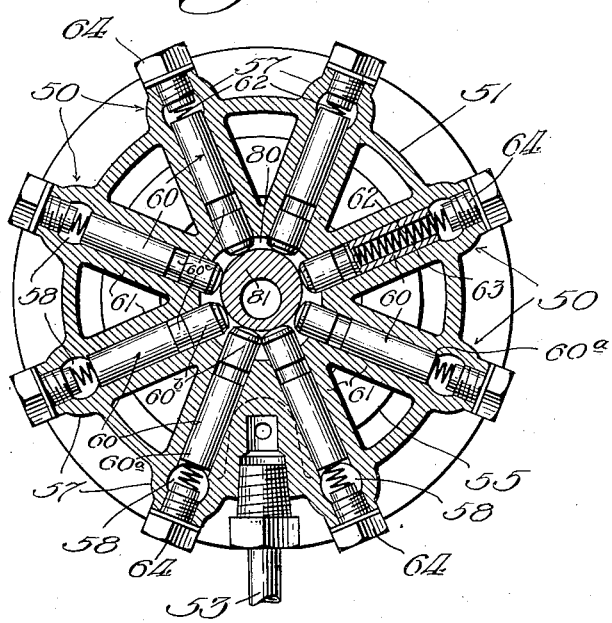
Fig. 10.
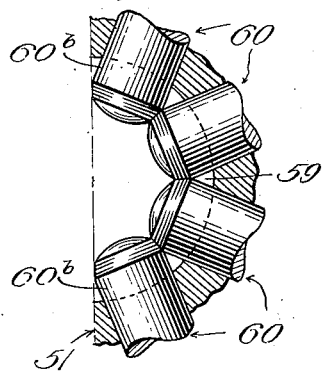
Fig. 14.
Fig. 13.
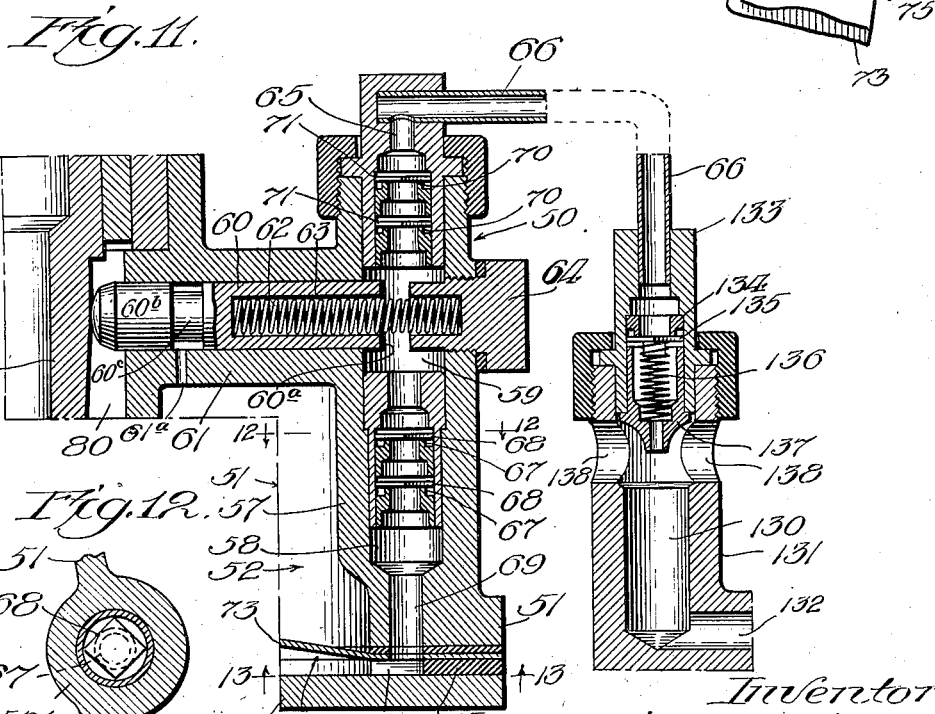
Fig. 11.
Fig. 12.
Inventor:
Percival S. Tice
By Rector, Hickey, Davis & Macauley
Attys.

May 2, 1939. P. S. TICE 2,157,034
FUEL SUPPLY SYSTEM FOR INTERNAL COMBUSTION ENGINES
Filed Aug. 3, 1934 6 Sheets-Sheet 6
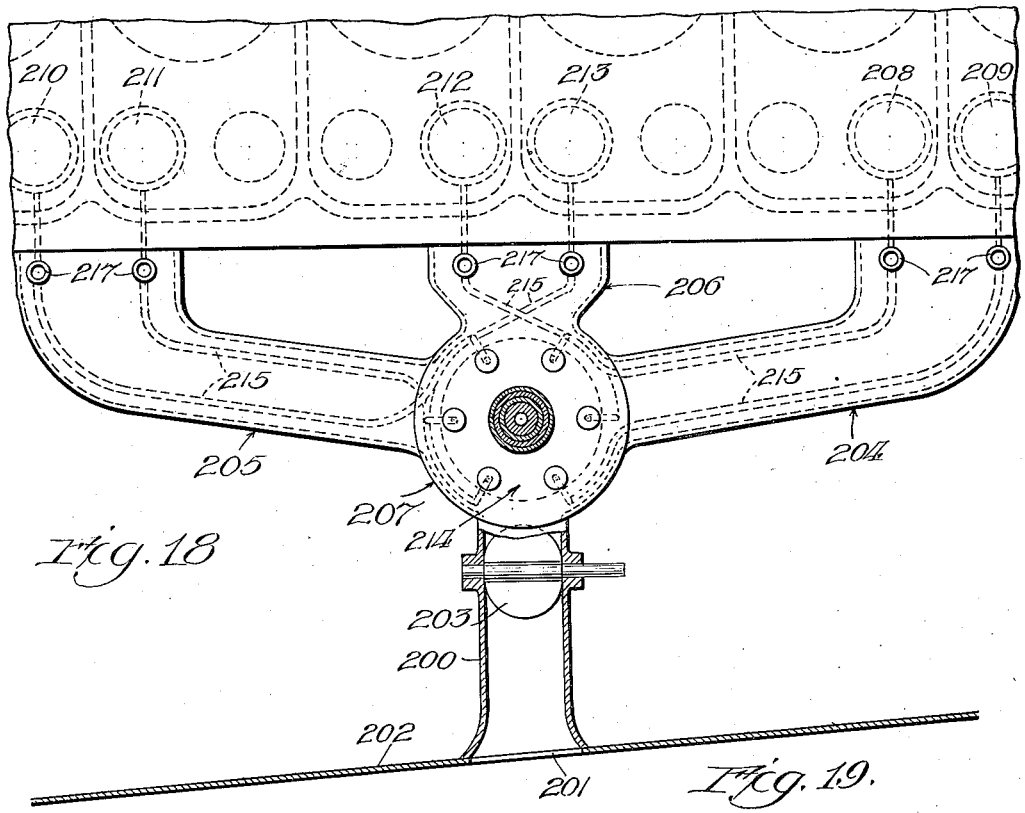
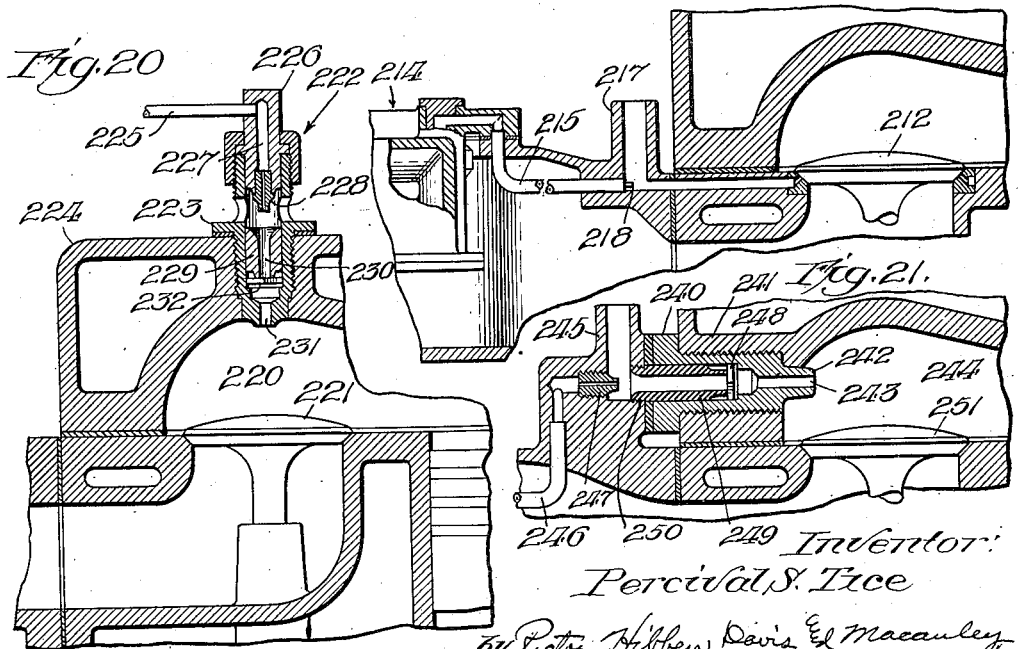
Inventor:
Percival S. Tice Patented May 2, 1939

2,157,034

UNITED STATES PATENT OFFICE 2,157,034

FUEL SUPPLY SYSTEM FOR INTERNAL COMBUSTION ENGINES

Percival S. Tice, Chicago, Ill.

Application August 3, 1934, Serial No. 738,276

50 Claims. (Cl. 123—139)

This invention relates to a fuel supply system for internal combustion engines, and particularly engines of the foregoing character that are throttle controlled.

The limitations and faults of prior fuel systems employing the usual carburetor and fuel distributing intake manifolds are well known. In the use of such systems, even under the most favorable operating conditions, equalization in fuel and mixture distribution to all of the engine cylinders is not accomplished. Material restrictions are imposed upon the volumetric efficiency (the ratio of cylinder filling) of the engine due to the reduction of effective passage section deemed essential to even approach proper fuel metering and fuel distribution. Limitations are necessarily imposed on the amount of air supplied. There is a lack of uniformity in air supply, which is a material factor in loss of power. In an attempt to remedy conditions in prior systems, intake manifold heating has been resorted to and, in certain cases, it has been employed to a point where distribution of fuel among the cylinders approaches equalization to a certain extent. However, this heating further reduces volumetric efficiency, as will be understood by those skilled in the art.

Also, in the use of such prior fuel systems, it is practically impossible to apply to the carburetor those mixture proportions which will result in the most effective use of the fuel and at the same time maintain satisfactory engine operation. This is due to inherent error in fuel distribution in systems of this character. More particularly, the optimum mixture (in the sense of highest utilization) is always much nearer the lean or upper limit of combustibility than the rich or lower limit; and, as these limits are approached, the rates of combustion reduce rapidly and at a much higher rate than for a like change of mixture proportions near the so-called mid range of combustibility. Wherefore, when the carburetor, for example, in all prior systems is adjusted to deliver optimum mixtures, the unavoidable inequality in fuel distribution in the intake manifold is great enough to cause some of the cylinders to operate on such a lean mixture that their effectiveness, at least, is reduced; and the only recourse under such circumstances is enrichment of the mixture in the carburetor with resultant wide departure from optimum mixtures in those cylinders getting the richer charges. As a result of the foregoing, among other things, in carburetor-equipped fuel systems, the efficiency of the engine as a whole, is of a comparatively low order; fuel waste and improper combustion take place; and power is lost under practically all load and operating conditions.

One of the objects of this invention is to provide an improved fuel supply system adapted to eliminate the foregoing, among other, shortcomings and defects inherent in prior fuel systems for throttle controlled internal combustion engines.

Another object is to provide an arrangement whereby the full load air pumping capacity of the engine cylinders, to which specific power delivery is directly proportional, is brought to the maximum capacity permitted by the intake system, this being accomplished, in part, by removal of restriction such as afforded by carburetors and reduced pipe sections, and by elimination of heating which has heretofore been essential to a workable distribution of fuel among the cylinders.

A further object is to provide for equality in fuel distribution among all the cylinders by the positive delivery of equal measured amounts of fuel to each cylinder under the control of the intake air pressure, the purpose being to feed the fuel to each cylinder only at those times when it should be fed and only in that quantity required for proper mixture ratio to meet the existent load condition of the engine and preserve the desirable feature of economy in fuel utilization.

Still another object is to provide a fuel supply system of the foregoing character so controlled as to positively maintain optimum mixture proportions from idling to full engine load, and wherein the mixture ratio changes take place over the entire engine load range without any substantial change in feel of engine to the operator.

Still another object is to provide for a mixture of fuel and air in proper proportion with the air at the lowest possible temperatures directly at each cylinder, whereby higher specific output (and lesser fuel consumption rate) over a wider range than heretofore possible is insured.

A further object is to provide means whereby qualitatively, this same mixture (in optimum mixture proportions) is maintained in each cylinder under each particular load condition so that all cylinders operate uniformly to meet the imposed load condition and the engine is caused to operate at all times with highest efficiency.

An additional object is to provide fuel feeding means controlled with respect to capacity by means variably controlled to effect variation in the fuel feed by the intake pressure. More specifically, my invention contemplates the use of positive feed means for delivering the same measured quantity of fuel to each cylinder under each particular load condition, the capacity of the fuel feeding means being controlled by the intake air pressure through means variable in control functioning to cause the fuel feeding means to deliver measured quantities of fuel for admixture with the intake air in such proportion as to meet the optimum mixture ratio for the particular existent engine load condition. Thusly, my invention provides the desired rich mixtures at full load for development of maximum power but under load conditions wherein full power is not required a leaner fuel economy mixture is supplied, whereby maximum power may be positively developed as and when needed and economy in fuel consumption is accomplished under operating conditions that permit of same.

A more specific object is to provide a simple fuel pump for each cylinder all of which pumps are actuated by cam means operable under the control of the air intake pressure to vary the stroke of the pumps, the air intake control being, in turn, further controlled to vary the stroke of the pump to feed fuel disproportionately to the air intake pressure in order to meet optimum mixture ratio operating conditions.

Still another object is to provide a fuel system in which mixture of maximum power strength is available when accelerating, provision being made for instantly enriching the mixture to provide desired power mixture strength upon any opening of the engine throttle for acceleration purposes. According to my invention, this is accomplished automatically through controlled variation of the air intake pressure control to affect fuel feed capacity to provide the mixture strength required.

An additional object is to provide for promptness in starting under cold weather conditions with a much lesser initial fuel supply than heretofore possible, this feature being accomplished, in part, by the mode of delivery of the fuel to the cylinders and, in part, through the features of the fuel system hereinbefore referred to.

A further object is to provide a novel method of fuel distribution whereby the foregoing features and advantages are accomplished. Other objects are to provide a fuel system in which the mixture strength is maintained at a value that will give steady engine operation on the least amount of fuel required to meet the optimum mixture ratio; to provide for attainment of operation under optimum mixture ratio conditions throughout the load range of the engine independent of engine speed; to provide for required flow of air to each cylinder under all operations wherefore the intended power development from each charge in each cylinder is insured; to provide for greater power development per unit of fuel; to increase mileage per unit of fuel used; to reduce fuel waste and cost of engine operation; to improve combustion of the mixture in the cylinder; and to provide for uniform and highly efficient engine performance under all operating conditions from idling to full load.

Other objects and advantages will become apparent as this description progresses and by reference to the drawings, wherein,—

Figure 1 is a top plan view of one form of fuel supply structure embodying my invention, the same being shown in its association with an eight cylinder internal combustion engine, only a portion of which is illustrated;

Fig. 2 is an end elevational view of the structure shown in Fig. 1 with the throttle in full open position;

Fig. 3 is a front elevational view of the structure shown in Figs. 1 and 2;

Fig. 4 is a digrammatic plan illustrating generally the timing relation of the fuel pump to the firing order of the engine cylinders;

Fig. 5 is an enlarged view similar to Fig. 2, except showing the fuel feeding mechanism and the intake portion of the engine in vertical section;

Fig. 6 is an enlarged top plan view, partially in section of the fuel pump control mechanism of Fig. 5;

Fig. 7 is a vertical section taken substantially on line 7—7 of Fig. 6, which section is taken substantially at right angles to the section of Fig. 5;

Fig. 8 is a partial section similar to Fig. 7, except showing the pump actuating cam of the fuel feeding mechanism in a different axial position for feeding a lesser amount of fuel;

Fig. 9 is a separated bottom plan view of the variable lift pump actuating cam illustrated in Figs. 7 and 8;

Fig. 10 is a horizontal section through the fuel pump structure, taken substantially on line 10—10 of Fig. 7;

Fig. 11 is an enlarged vertical sectional view through one of the fuel pumps and its connections leading to its respective cylinder, taken substantially on line 11—11 of Fig. 1;

Fig. 12 is a section taken substantially on line 12—12 of Fig. 11 and showing more clearly the structure of the check valves employed in the pump structure;

Fig. 13 is a section taken substantially on line 13—13 of Fig. 11 and illustrating the fuel flow connection leading from the pump fuel supply chamber into the pump chamber;

Fig. 14 is a fragmental view of the pump structure showing the relative positions assumed by the pump plungers when their operating cam is removed;

Fig. 15 is a vertical sectional view taken substantially on line 15—15, of Fig. 7, and illustrating accelerator control means through which enrichment of mixture is effected when opening the throttle for acceleration purposes;

Fig. 16 is a section taken substantially on line 16—16 of Fig. 15.

Fig. 17 is a fragmental plan view of the intake valve seat of the engine illustrating the fuel discharge ports therein;

Fig. 18 is a top plan view of a modified form of fuel supply structure embodying my invention, the same being illustrated in its association with a six cylinder internal combustion engine and hood structure covering such engine;

Fig. 19 is an enlarged somewhat distorted sectional view through the fuel pump and fuel supply structure shown in Fig. 18;

Fig. 20 is a vertical sectional view through a modified form of structure for admitting the fuel to the engine cylinder;

Fig. 21 is a vertical sectional view through structure illustrating still another manner of admitting fuel directly to the cylinder; and Fig. 22 is a vertical sectional view of a further modified form of structure for admitting fuel to the cylinder.

The structure shown in the drawings (referring particularly to Figs. 1 to 17, inclusive) includes an engine having a plurality of cylinders 30 in each of which a piston 31 operates. A mixture of fuel and air is fed into a combustion space 32 above each piston under the control of an intake valve 33 that may take any desired form. The intake valves for the several cylinders may be supplied with air independently of each other, or from a passage common to all; or, as shown in Fig. 4, they may be arranged in "Siamesed" relation with a separate, comparatively large size air intake pipe 34 (Figs. 1, 2, 3 and 5) being provided for each "Siamesed" pair of intake valves. The engine illustrated in Figs. 1 to 17, inclusive, is of an eight cylinder type having Siamesed intake ports, and I employ, therefore, four intake pipes 34. In each of the air intake pipes 34, adjacent the outer or inlet end thereof, I mount a conventional form of throttle valve 35. Each throttle valve is fixedly carried by a cross shaft 36 having its opposite ends pivotally mounted in the respective intake pipe 34 and to one of which ends is connected a crank arm 37. Each crank arm 37 is connected by a link 38 and a crank arm 39 to a single throttle-control rod 40 having its opposite ends rotatably supported at 40ᵃ and 40ᵇ. An arm 42 is connected to the left end of the control rod 40 (Fig. 1) and this arm may be moved in any desired manner to rotate the shaft 40; such, for example, as the manner now employed in connection with automotive constructions. It will be clear that upon rotating the throttle control shaft 40 in one direction, the throttle 35 is moved toward an intake pipe closing position (or closed throttle position) and when rotated in the opposite direction is moved toward the open throttle position of Figs. 2 and 5.

The air intake pipes 34 are of such cross sectional area and are sufficiently free of sharp and obstructive bends to insure a free and unrestricted flow of that requisite amount of air therethrough to meet full-charging needs of the engine under all (including full load) operating conditions. The several air intake pipes 34 are cross-connected (Figs. 1 and 3) between the throttle valves 35 and the engine cylinders 30 by pipes 41 that are of such size as to provide for intake air pressure equalization freely and without obstruction throughout all such air intake pipes. The pipes 41 insure easy effective synchronization of the several throttles, particularly when their openings are small.

It will be seen from Fig. 1 that, upon rotating the throttle control shaft 40 through its control arm 42, all of the throttle valves 35 will be simultaneously opened or closed to a similar extent so that the same amount of air flows through each intake air pipe 34 to each air intake valve 33, and the intake air pressure between the throttle valves 35 and the engine is the same in all the air intake pipes. Wherefore, if the same amount of fuel is fed into each cylinder and is properly admixed with the admitted air, then the same mixture proportions will be fed to each and every cylinder so that they will all perform in a uniform manner.

The fuel, which may be gasoline, or the like, is, preferably, fed in substantially liquid form through a relatively short passage 132 to a relatively small annular chamber 43 in the intake valve seat 33ᵃ from which it is discharged into the combustion chamber 32 through a plurality of ports 44 when the intake valve 33 is opened on the intake stroke of the engine. As the fuel is thus fed, it is thoroughly admixed with air from the intake pipe 34 providing the proper combustible mixture, as more fully pointed out in my co-pending application, Serial No. 600,699 now Patent No. 2,033,211. Briefly, in feeding the air and fuel and mixing the same in this manner, the charge temperatures in the cylinders, during and at the end of the compression stroke, are considerably less than ordinary for a given expansion ratio because the air portions of the charges entering the cylinders are at a comparatively low temperature and, by delivering the fuel and air directly to the cylinder in their normal states, the whole of the heat involved in the vaporization of the fuel is taken from the cylinder content and from the cylinder and combustion walls, thereby reducing compression temperatures and making possible the use of appreciably greater expansion ratios without detonation or knocking. This is an important factor in increasing specific output and reducing specific fuel consumption.

The flow of fuel to the intake valve seats 33ᵃ is so controlled that the same amount of fuel is fed to each cylinder at any particular engine load. This is accomplished under the control of the pressure of the air in the intake pipes 34 between the throttle valves 35 and the engine, the control being such tha the amount of fuel required to provide the optimum mixture ratio for the particular load condition is fed. This fuel flow control is a positive one so that there is definite assurance of equal amounts of fuel for the several cylinders, all independently of the speed of the engine and other conditions that may exist in the performance of the engine itself.

The fuel control means illustrated in the drawings for carrying out the foregoing feature of my invention will now be described.

The fuel control means includes a plurality of quite simple and inexpensive, yet highly efficient, fuel pumps 50, there being one of these pumps for each cylinder. These pumps are arranged in annular fashion within the lower part of a casing 51 (Figs. 2, 3 and 7), which is constructed to provide a fuel chamber 52 (Figs. 7 and 11) connected to the several pumps in a manner which will become clear hereinafter. The fuel chamber 52 is connected to the fuel source (not shown) by a pipe 53 (Figs. 2 and 5) leading to a float valve 54 in the casing 51 that controls the flow of fuel from the supply pipe 53 into the chamber 52. The valve 54 is controlled by a float 55 located within the chamber 52 and, as will be readily understood, when the level of the fuel in the chamber 52 reaches a certain level, the float arm 56 engaging the lower end of the valve 54, closes the same so that no more fuel can flow into the fuel chamber 52; and when the level of the fuel in chamber 52 is lowered the float moves downwardly to permit the valve 54 to open and replenish the fuel chamber supply.

The fuel pumps 50 are of identical construction and but one of them will be described in detail. The fuel pump includes a vertically disposed casing portion 57 (Fig. 11) providing an elongated valve chamber 58, the central portion 59 of which serves as a fuel reservoir in which the end 60ᵃ of a radially-disposed pump plunger 60 reciprocates. The pump plunger 60 is supported for reciprocation by a longitudinally-disposed casing portion 61 which extends substantially throughout the length of the plunger for firm and uniform guidance of the latter. The pump plunger 60 is normally urged outwardly or away from the fuel reservoir 59 by a spring 62 having one end thereof seated within a recess 63 in the rear end of said plunger and its other end received in a spring-supporting screw 64 in axial alignment with the plunger.

It will be clear from the foregoing that when the pump fuel chamber 59 is filled with fuel, reciprocation of the plunger 60 will effect a fuel displacement within the pump chamber, forcing fuel therefrom through the pump outlet 65 which, in turn, is connected through a fuel conduit 66 (Fig. 11) to the intake valve seat 33ª in a manner that will be described in greater detail hereinafter.

For proper operation of the pump and to insure a constant inlet and discharge of fuel from the pump chamber 59, the fuel pump is further provided with quite simple yet rapidly-acting and highly efficient check valve means. The pump check valve means at the inlet end of the pump chamber 59 takes the form of a pair of vertically spaced, annular valve seats 67 and a pair of rectangularly-shaped check valves 68 formed of any suitable and light weight material. These check valves are of such dimensions that when they engage the valve seats 67, they close the pump inlet passage 69 to prevent backing up of fuel therethrough when the pump plunger is moved inwardly on its discharge stroke. However, when the pump plunger 60 moves outwardly on its inlet stroke, or away from the pump chamber 59, the action is such, as will be well understood, to lift the check valves 68 from their seats, the rectangular shape of the valves 68 permitting the fuel to flow through the fuel passage 69 past such valves into the fuel chamber 59 to replenish the supply therein.

The discharge end of the pump chamber 59 is provided with valve seats and check valves 70 and 71 similar to the seats and valves 67 and 68. Upon the intake stroke of the pump, the check valves 71 are moved down against their seats 70 to prevent drawing fuel from the conduit 66 and from the engine side of the pump on the inlet stroke of the pump when the valves 68 are open; but on the discharge stroke of the pump plunger 60, when the check valves 68 are seated, the check valves 71 are forced open by the displacement action of the pump plunger thereby permitting the fuel to be discharged through the passage 65 to the conduit 66 leading to the engine cylinder.

In the use of this structure, the entire fuel supply means from the reservoir 52 is constantly filled with fuel and the amount of fuel discharged is that amount caused by displacement of the pump plunger 60, as insured by the check valve arrangement. Different amounts of fuel may, obviously, be discharged by varying the length of stroke of the pump plungers 60.

To insure a constant supply of fuel throughout the pump system, particularly when the structure is operating with the parts disposed at a rather sharp angle with respect to the horizontal, I provide a trap 72 in the bottom of the fuel chamber 52, which trap is formed by an inverted cone-shaped plate or disc 73 having an opening in its center leading into the chamber 52. The only communication between the fuel chamber 52 and the pump inlet 69 is through the trap chamber 72 and this is accomplished as follows: The bottom of the trap consists of the detachable plate member 74 which is sealed against the lower part of the casing 51 by a ring-shaped gasket 75. This gasket is provided with cut-outs 76 (Fig. 13), one for each pump, which lead from the bottom of the pump intake passage 69 to the inner edge of the gasket providing a comparatively shallow passageway connecting the trap 72 with the pump inlet passage 69. With this arrangement, the fuel is so trapped that when the structure is disposed at such an angle as to lower the level of the fuel adjacent a pump 50, there is always a fuel supply available between the chamber 52 and trap 72 and the pump chamber.

The outer ends 60ᵇ of the pump plungers project into the lower portion of a central chamber 80 formed within the casing 51. The outer ends of these plungers are slightly bevelled and they are so arranged in their radial positions that when they are all simultaneously moved inwardly to the same extent they abut against each other (Fig. 14) and limit the inward movement thereof. In other words, they serve as stops for each other when their actuating means, which will now be described, is removed, as illustrated in Fig. 14.

As stated above, the amount of fuel fed by each pump depends upon the length of the stroke of the pump plunger 60. In carrying out my invention, the length of the stroke of the pump plunger is varied proportionately to the pressure of the intake air between the throttles 35 and the engine. This control is varied in such a way as to provide mixture proportions of air and fuel meeting the optimum mixture ratio for the particular engine load.

More particularly, the pump plungers 60 are reciprocated by a variable lift cam 81 located in the well 80 and adapted to be moved axially under controlled influence of the intake air pressure to vary the lift of the cam and, in turn, the length of stroke of the pump plungers. The cam 81 has a tubular and cylindrical shank or body portion 82 (Figs. 5 and 7) that is provided with a diametrical shaft 83 supporting an external roller 84 that rides freely in a vertical slot 85 within a sleeve 86 surrounding the cam body 82 (Fig. 5). Thusly, the cam body 82 and the sleeve 86 are fixed for rotary movement together but the cam 81 and its body 82 may be shifted axially with respect to the sleeve 86. The cam member 81, preferably, takes the shape illustrated in Fig. 9. That is to say, its upper end portion is cylindrical and is, at the same time, eccentric with respect to its upper or body portion 82. From its upper portion, this cam member 81 slopes inwardly toward its lower end in cone-shaped fashion and in such a manner that its lower end portion is cylindrical and is concentric with the upper or body portion 82. This provides a variable cone-shaped cam surface, the eccentricity of which varies from the upper part of the cam gradually toward its lower end where concentricity exists. Wherefore, greatest lift exists at the upper end of the cam member 81 so that, upon rotation of the cam member 81 in contact with the outer ends 60ᵇ of the pump plungers 60, the pump plungers will be given their longest stroke. Then, as the cam member 81 is shifted axially upward so as to locate the contact between it and the pump plungers toward the bottom of the cam member, the stroke of the pump plungers is gradually lessened so as to feed lesser amounts of fuel. The slope of the cam member, or the variable lift thereof, is substantially a uniform one so that the variation in cam lift and pump plunger stroke is uniformly variable between its greater and least lift limits.

The cam member 81 is driven rotatably with its supporting sleeve 86 by a gear 87 secured to the latter. It is desirable that the gear 87 be driven at cam shaft speed for proper synchronization of the fuel feed system with the operation of the engine intake valves 33. I have found that one desirable way of accomplishing this drive is through the ordinary engine timer shaft which is, in turn, connected to the engine cam shaft. Such a connection is illustrated in Fig. 5 wherein the timer shaft 88 supports a gear 89 identical with the gear 87, the gear 89 being interconnected with the gear 87 by a suitable idle gear 90 which is supported in mesh with both the gears 87 and 89 by a ball bearing 91 suitably provided within the casing 51. The casing 51 is provided with an upper and removable section 51ᵃ to facilitate this gear arrangement and in which is located the means for controlling the axial shift movement of the cam under the influence of the intake air pressure.

The chamber 80 is closed at the bottom and forms a sump or well containing oil for lubrication of the cam 81, pump plungers 60 and associated mechanism. Vent drillings 61ᵃ are provided in the plunger guides 61 (Fig. 11) and grooves 60ᶜ in the plungers 60 register with the vents 61ᵃ so that fuel leakage along the plungers 60 is returned to the central fuel reservoir 52 via the vents 61ᵃ and grooves 60ᶜ, thus protecting the oil in chamber 80 from dilution.

The cam member 81 and its supporting body are mechanically shifted axially by an air piston 100 mounted in a chamber 101 located in the casing section 51ᵃ directly above the upper or body portion of the cam member. The piston 100 is connected to the upper end of the cam member body 82 by a plug member 102 fixedly secured in the upper end of the cam body and having a reduced projecting shank on the upper end of which is mounted a ball bearing 104. The central underside portion of the air piston 100 is provided with a recess that receives the ball bearing 104 which is retained in such recess by a plate 106 that is secured to the bottom of the air piston by one or more screws 107. This arrangement permits rotation of the cam member 81 without rotating the air piston 100 and, at the same time, permits the air piston to move back and forth within the chamber 101 without affecting the free rotatability of the cam member. This rotatable connection is also such that the shift movement of the cam by the air piston is positive without back lashing or any play action which would tend to disturb the predetermined relationship of the shift-parts.

The air piston 100 is shifted under the control of the air intake pressure and to this end the chamber 101 is normally connected to the air intake pipe 34, at a point between the throttle valve 35 and the engine, by a pipe 108 (Figs. 1, 2 and 7) and a valve structure 109.

Generally speaking, the air piston 100 is moved variably according to variation in the intake air pressure to vary the axial position of the cam 81, and, in turn, the amount of fuel fed, the arrangement being such that as throttling is changed to vary the intake air pressure the position of the cam will vary to vary the length of the stroke of the several pumps. However, the variation in movement of the air piston for this purpose, according to my invention, is not constant with the variation in the intake air pressure because optimum mixture proportions would not then be provided throughout the entire load range, for reasons that will now be briefly mentioned.

Fundamentally, as the engine is throttled, the pressure in the air intake passage and the chamber 101 above the air piston 100 is reduced, thus tending to draw the air piston 100 and the pump cam 81 upwardly to a position of lesser pump cam lift and pump stroke thereby reducing the amount of fuel delivered; and vice versa as the throttle is opened.

In throttle controlled engines the weight of the air charge per cycle varies linearly with the absolute pressure in the intake passage. With the throttle wide open and the intake passage completely free, the pressure in this passage will be atmospheric and, hence, the maximum air charge will be taken in. As throttling is imposed and is increased to that point at which the engine develops just enough power to turn itself (idling), it is found that the weight of the air taken plotted graphically against the intake passage pressure follows a straight line. Other conditions being constant, an engine never departs from its air weight to intake pressure characteristic.

If the fuel pump cam 81 be given a rise and axial position such that fuel in amount to produce the desired full load mixture ratio is discharged at atmospheric pressure in the engine intake (and above the chamber 101), one may, through the employment of a spring (for example) above the air piston, permit the pump cam to be deflected axially in such a way as to serve the engine with a mixture of constant ratio throughout its complete range of load. However, such constancy of mixture ratio is not desired and it is always sought, in so far as fuel distribution will permit, to apply a maximum power mixture proportion at full load and at lesser loads to apply a mixture containing lesser relative amounts of fuel in the interests of reduced specific fuel consumption. To produce the maximum power delivery requires that enough fuel be used to burn all the air. To produce least specific fuel consumption requires that all the fuel be burned. Maximum power requires a small excess of fuel (rich mixture), while minimum fuel consumption requires considerable excess of air (lean mixture).

Further, while least specific fuel consumption is desired at other than full load, the charge dilution in the cylinder (with combustion products from the preceding cycle) that increasingly occurs with progressive throttling imposes mixture enrichment to maintain least specific fuel consumption as the idling condition is approached. The condition, normally, is, therefore, such that at idling the least fuel consumption mixture is substantially equal in fuel strength to that needed for the development of maximum power. These fundamental requirements are imperfectly met in prior fuel systems in the presence of inequalities of fuel distribution among the cylinders, which inequalities impose over-rich mixtures, making the realization of either maximum power delivery or minimum specific fuel consumption utterly impossible.

My invention provides for full realization of and maximum benefit of the foregoing fundamentals. It provides for the feeding of such amounts of fuel (in equal amounts to each cylinder) from idling to full load, that the mixture proportions meet optimum mixture ratio conditions. The mixture proportion changes are accomplished in the use of my invention in such a manner that the change is smooth and unnoticeable to the operator. For facilitating further explanation of my invention, it may be understood that the structure shown in the drawings is so arranged and adjusted as to provide for fuel mixture proportions following a recognized optimum mixture ratio scale.

I accomplish the foregoing control by the provision of springs acting on the air piston 100. Specifically, I preferably employ three springs 110, 111, 112 that act successively upon the top of the air piston 100 in opposing its upward movement as the air intake pressure is decreased by throttling, and a spring 113 that acts on the under side of such piston to support the weight of the air piston and the fuel cam 81. The spring 113 is of such length as to tend to urge the air piston upwardly to the full limit of its upward stroke, while, at the same time being of such weight that, normally, the spring 110 acting on top of the air piston compresses the same and holds the air piston 100 in its position of Fig. 7 when the pressure in the chamber 101 is atmospheric. In other words, the springs 110 and 113 are of such character that the air piston is, so to speak, floatingly supported in equilibrium thereby in the normal position of the structure as illustrated in Fig. 7. When the air piston is in its normal position of equilibrium, the fuel cam 81 is moved axially downward to its position of greatest lift (Figs. 5 and 7) to move the pump plungers 60 bearing thereagainst with longest stroke. This is a condition which exists when the air intake pressure is atmospheric with the throttle wide open, at which time enrichment of mixture is required for full power development.

The spring 110, while being of a length adapted to locate the air piston 100 in full load fuel delivery position, is of such character as to oppose movement of the air piston in a manner to give the desired rate of change in mixture strength from full load or maximum power mixture strength to that of minimum specific fuel consumption which (according to the optimum mixture ratio), for example, may be said to be at from .7 to .8 load. That is to say, with the air chamber 101 connected to the air intake pressure as the engine is throttled down from full load, reducing the air intake pressure, the spring 110 is of such length and strength as to permit the air piston 100 to rise at a rate to deliver relatively less fuel by axially raising the fuel cam 81 to cause the pump plungers 60 to make shorter strokes and deliver decreasing amounts of fuel. Consequently, as the air piston 100 raises under the control of the spring 110, the mixture is gradually reduced from an enriched one to a leaner one.

Unless means were provided otherwise, as throttling is continued, the mixture would become leaner and leaner in constant ratio if the spring 110 only were employed. This, though, would not meet the requirements of the optimum mixture ratio scale. Therefore, to meet the requirements of the optimum mixture ratio scale and to provide for the desired minimum specific fuel consumption ratios (desired leanness of mixture with intended fuel economy), I provide a second spring 111 which is of a length adapted to be picked up by the air piston at the point in the load range (approximately from .7 to .8 load) at which it is intended that the minimum specific fuel consumption ratio be arrived at in the deflection of the first spring. It will, therefore, be seen that after the air piston 100 picks up the spring 111 its further upward movement (or tendency toward upward movement) through reduction in air intake pressure by further closing of the throttle is opposed by both of the springs 110 and 111. The combined action of these springs is such as to position the fuel cam 81 for delivery of the requisite amount of fuel (amount of fuel fed reduced now at somewhat lesser rate proportionately than reduction in intake air pressure) for meeting the optimum mixture ratio conditions throughout the entire mid range of load. Throughout this mid range, the mixture ratio is gradually, but slightly, enriched to a point in the load range (say about .3 load) where idling is begun to be approached. This condition is brought about through the retardation action of the two springs 110, 111 increasingly to supply proportionately a greater amount of fuel (as compared to decrease in intake air pressure) as the throttle is moved toward its closed position.

As the end of the mid range of load is reached and idling is begun to be approached, an increased rate of mixture enrichment, because of engine charge dilution with combustion products, is required. To accomplish this result, the spring 112 is employed. This spring is of such a length that it is picked up by the air piston 100 at that point in the load range at which the increasing charge dilution demands an enrichment rate in excess of that provided by springs 110 and 111, for maintenance of optimum mixture strength. After the air piston 100 picks up the spring 112, and from that time on to closed throttle position wherein idling is reached, movement of the piston 100 under the influence of the intake air pressure is opposed by all three springs 110, 111 and 112. Consequently, the tendency of the air piston to rise proportionately to the decrease in intake air pressure is still further opposed resulting in further retardation in upward shift of the fuel cam 81 whereby greater amounts of fuel proportionately to the air intake pressure are fed by the fuel pump causing the desired enrichment of mixture for idling operation.

The mixture proportions provided by the foregoing arrangement may be varied to meet any particular conditions of use by varying the positions (and/or strengths) of the springs 111 and 112 so that they are picked up sooner or later comparatively to the intake air pressure. In this way, a richer or leaner mixture may be provided for at different positions in the engine load scale. To facilitate proper positioning of the springs and initial setting of the same to meet the desired conditions, the springs 111 and 112 may be supported for axial adjustment as illustrated in Fig. 7.

Specifically, the longer spring 110 may be of predetermined length and strength, and it is supportingly confined between the air piston 100 and the shoulder 114 of a tubular nut 115 screwed into a threaded opening in the upper part of the casing section 51ª. When this spring is once positioned so as to hold the piston 100 in equilibrium and in balance with the spring 113, it is locked in that position by a spring pressed plunger 116, the inner end of which is urged inwardly into engagement with one of a plurality of notches 117 in the head of nut 115.

The spring 111 has its upper end surroundingly secured to the depending reduced neck 118 of a second hollow nut 119 screwed into the hollow nut 115. The nut 119 is screwed into the nut 115 to such an extent depending upon the length of the spring 111, as to position the lower end of the spring 111 for pick-up by the air piston when the desired point in the load range of the engine is reached and optimum or maximum economy mixture strength is attained. The nut 119, once adjusted, is fixedly locked in position by a second spring pressed plunger 120 engaging notches 121 in the periphery of the head of the nut, similarly to the nut 115.

The third spring 112 has its upper end surrounding and secured to a depending reduced end 122 of a threaded stem 123 that is screwed into the hollow nut 119. The spring 112 may be of such length, and by this arrangement, the stem 123 may be screwed into the nut 119 a sufficient extent, to properly pick up the air piston at the point in the engine load range where idling is begun to be approached. The stem 123 is locked in position by a spring pressed plunger 124 similarly to the nuts 119 and 115, above described. From the foregoing, it will be obvious that, in employing a spring 110 of desired length and strength to properly position the air piston to cause the pump cam to actuate the fuel pumps to give maximum fuel supply at full engine load (open throttle), the springs 111 and 112 may be positioned and adjusted to position the cam to cause the fuel pump to deliver requisite amounts of fuel at preferable positions in the engine load scale to give the desired mixture ratio for best operation of the engine from both fuel economy and power standpoints.

As illustrated in Fig. 4, the several fuel pumps 50 are so annularly located that they operate in time with the firing order of the engine cylinders. That is, the order of delivery of fuel to each cylinder is the same as the cylinder firing order. Referring to Fig. 4, beginning with cylinder marked #1, and assuming that the fuel cam member 81 is rotated in clockwise direction, it will be seen that the fuel cam 81 actuates the fuel pump plungers 60 to deliver fuel first to No. 1 cylinder and then successively to cylinders Nos. 4, 7, 3, 8, 5, 2 and 6. The timing of the pump may, obviously, be accomplished by selective meshing of the cam driving gears 87, 89 and 90; and, obviously, this timing arrangement may be varied by selective meshing of these gears.

The manner of delivery of the fuel from the fuel pump to the engine cylinder is of importance in carrying out my invention. The fuel is so fed that the fuel pump outlet is protected from the suction of the engine in the sense that such suction does not operate to withdraw fuel from the pumps. In so divorcing the fuel feed from the suction of the engine, I am also enabled to use a very simple pump mechanism, such as I have already described, with small or negligible loadings of parts (plungers, valves), and hence capable of operation at relatively very high speeds.

The means for receiving and delivering the fuel to the cylinders as illustrated in Figs. 5 and 11 takes the form of a comparatively small chamber 130 formed in an upstanding, inner end portion 131 of the air intake pipe, there being one such chamber for each air intake valve 33 in close proximity to the latter. This chamber 130 is connected to the relatively short passage 132 which is formed, preferably, in the engine cylinder block. The bottom of the chamber 130 is substantially at the level of the passage 132 so that all of the fuel that may be deposited in the chamber 130 may flow directly and freely therefrom to the fuel chamber in the intake valve seat 33ᵃ.

The upper end of the portion 131 above the chamber 130 receives a union member 133 to which the outlet end of the respective fuel discharge pipe 66 is connected so that fuel from the pump 50 is fed directly into such union structure. The union member supports means for additionally controlling the discharge of fuel from the pipe 66 into the chamber 130. This means takes the form of an inverted valve seat 134, a thin rectangularly-shaped check valve 135 (similar to that shown in Fig. 12), a spring 136 constantly urging such check valve 135 into seated position against the seat 134, and a nozzle member 137 through which the fuel is discharged into the chamber 130 and which serves as a retainer for the spring 136. With this arrangement, the pressure of the fuel in the pipe 66, on the discharge stroke of the pump 50, unseats the check valve 135 against the pressure of its spring 136 so that a charge of fuel is forced thereby and through the nozzle 137 into the chamber 130.

Each fuel pump 50 is so timed that fuel is completely discharged thereby into the fuel chamber 130 prior to the time that the engine piston 31 completes its intake stroke so that the fuel chamber 130 for that particular cylinder is swept clear of fuel by the time the intake stroke is completed. I have found that excellent results may be obtained by so timing the pump that the discharge of fuel is completed by the time the piston is approximately three-fourth of the way down on the intake stroke. This particular timing arrangement may not be absolutely necessary, but it is preferable for the greatest realization of equal fuel distribution. For example, if a timing arrangement should be employed wherein fuel might be left in the chamber 130 for any particular cylinder at the time the intake valve 33 closes (at the end of the intake stroke) then an unequal distribution might occur upon feeding of successive charges.

The chamber 130 is freely vented through comparatively large openings 138 in the portion 131 at and beneath the discharge end of the nozzle 137. By venting the fuel chamber 130, the admission of the fuel into each cylinder is independent of any pressure action of the pump, and the pump is freed of any effect due to the suction of the engine. Further, with this arrangement, air or gaseous fluid is fed from the chamber 130 along with the fuel to the cylinder thereby making the liquid fuel more mobile for entering into the cylinders. This also aids in the spraying and vaporization of the fuel with better diffusion of the fuel throughout the air entering within the cylinder. This also positively guards against any overlapping of fuel charges throughout successive cycles of operation of the engine and, consequently, insures that each cylinder will have the same uniform amount of fuel fed thereto during each cycle of operation. The small fuel chamber 130 also serves to disassociate the pump timing from the engine timing insofar as beginning of fuel discharge by the pump into the chamber 130 is concerned; wherefore, the pump feeds and accumulates fuel in this chamber independently of the engine cycle completion so that there is always a supply of fuel ready when the intake valve opens. This condition is uniform for all cylinders regardless of slight variations in pump timing and variations with respect to the beginning of intake strokes for various cylinders.

It will be understood that while I have obtained excellent results by venting the chambers 130 to atmosphere, it is within the contemplation of my invention, if desired, to subject the fuel in such chambers to super-atmospheric pressure to further divorce the pump 50 from the suction of the engine and to increase the rate of movement of the fuel into the combustion space of the cylinder. This may be desirable in certain instances under high speed operating conditions, where the duration of each cycle is very short, to further insure that the charge chambers will be swept clear of the fuel charge by the time the intake valve closes.

One arrangement of the foregoing character is illustrated in Fig. 22. Specifically, the intake valve 260 (of the overhead type, as shown, or otherwise) and its seat 261 are similar to the valve 33 and seat 33ª of Fig. 17. The valve seat is provided with an annular fuel-receiving channel 262 and a plurality of ports 263 leading to the face of the seat 261 where the discharge of fuel therefrom to the intake air is controlled by the intake valve 260. The seat channel 262 is connected by a relatively short passage 264 to a pressure chamber 265, there being one such chamber for each cylinder. The passage 264 and chamber 265 are connected to pump mechanism, similar to that already described, by a pipe 266 and union fitting 267, the fuel being fed into chamber 265 in measured charge quantity. The charge of fuel is discharged directly into the passage 264 through a restricted jet or nozzle 268 that functions in the same manner as the jets 218 and 247 of the forms of Figs. 19 and 21, respectively. The fuel delivered to the passage 264 is subjected to the pressure built up in the respective cylinder 269 on the working stroke of the engine, or when the intake valve 260 is closed, so that when the intake valve is opened the charge of fuel is forced into the cylinder under super-atmospheric pressure.

More particularly, the upper portion of the pressure chamber 265 is connected to the cylinder 269 by a relatively short passage 270, a one-way check valve 271 and another short passage 272. The check valve 271 is normally held seated by a spring 273 to close communication between the passages 270 and 272, but on the working stroke of the engine, and when the intake valve 260 is closed, the pressure built up in the cylinder overcomes the pressure of spring 273 and unseats the valve 271 so that gas under pressure is forced from the cylinder into the chamber 265 where it is retained against back flow by the check valve 271 until the opening of the intake valve 260. It will be understood that the timing of the fuel feed may be the same as in the previously-described form so that, when the intake valve 260 opens, the cylinder gas stored in chamber 265 under the greater cylinder pressure expands and forces the fuel charge from the passage 264 through the intake valve seat ports 263 into the stream of air entering the cylinder. At this time the reduced engine cylinder pressure, together with spring 273, holds valve 271 seated cutting off the charge chamber 265 from the cylinder via passages 270 and 272. With this arrangement, each charge of fuel delivered by the pump mechanism is swept clear of the chamber 265 and passage 264 regardless of the speed of the engine. The passage 264 may be of sufficient capacity to receive the maximum fuel charge or part of the charge may be received in the chamber 265; but in either event the operation is substantially the same.

Full power response under conditions of acceleration are highly desirable for best operation. This invention insures this feature. When the speed of an engine is to be increased, or an increased load is assumed, the maximum response results from the use of maximum power mixture strength. This, as hereinbefore explained, is brought about through enrichment of the mixture to establish the mixture proportions necessary for development of maximum power. According to my invention, provision is made for instantly enriching the mixture upon any opening of the engine throttle, whereby rapid accelerations may be made from conditions of operation on minimum specific fuel consumption ratios (lean mixtures) with a free and uniform flow of power to rapidly bring up the engine to the desired speed. The foregoing feature is accomplished by raising the pressure in the chamber 101 above the then-existent intake air pressure to move the piston 100 and the pump cam 81 to a greater cam rise position to deliver a proportionately greater amount of fuel for mixture enrichment as the throttle is moved toward open position in an acceleration operation.

Specifically, referring to Figs. 5 and 6, the upper end of the upper casing section 51ª is provided with a horizontally-disposed, cylindrical valve chamber 140 that is connected to the chamber 101 above the air piston 100 through one or more ports 141. The outer end of the chamber 140 is closed by a plug 142 having an axial opening 143 therein connecting the chamber 140 with atmosphere. The plug opening 143 is normally closed by a spring-pressed valve 144, the rear portion of which has the cross-sectional shape illustrated in Fig. 5 and the forward portion is cone-shaped to seat against the inner edge of the plug wall defining the inner end of opening 143. It will be seen that, upon opening the valve 144 the chamber 101 will be connected to atmosphere, so that the pressure in the chamber 101 is raised toward atmospheric pressure to an extent dependent upon the degree of opening of the acceleration valve 144. That is to say, by thus connecting the chamber 101 to atmosphere, say for acceleration purposes at any throttle position below full open throttle, the pressure in the chamber 101 is raised above that of the air intake pressure causing the air piston and pump fuel cam 81 to move downwardly to a greater extent than it otherwise would under the control merely of the then-existent intake air pressure. This, therefore, causes, through increased pump stroke, the suppy of a greater amount of fuel to the cylinder and, consequently, enrichment of the mixture for increase of mixture strength toward the maximum. This results in acceleration in engine speed. This action continues so long as opening movement of the throttle is continued in acceleration manipulation, and it is discontinued at or shortly after the time that the opening of the throttle is stopped, restoring the fuel supply to the direct control of the air intake pressure.

Opening and closing of the acceleration valve 144 is accomplished to the foregoing end by the provision of a dash-pot device 145 (Figs. 1-3, 6, 15 and 16) which serves to inter-connect the throttle control shaft 40 and the acceleration valve 144.

The dash-pot structure 145 includes a cylindrical, two-part casing 146 which is mounted upon and freely rotatable about a sleeve 147 fixedly secured to the throttle control shaft 40. The casing 146 provides a chamber 148, the plane of which extends at right angles to the axis of the throttle control shaft 40, and this chamber is adapted to be filled with any suitable fluid, preferably on oil that will not be materially affected by temperature changes. The casing 146 supports a radially-extending vane 149 having a parti-circular head 150 at its inner end rotatably bearing upon the sleeve 147. The sleeve 147 is provided with a radially-extending vane 151 adapted to rotate with the sleeve 147 and the throttle control shaft 40.

The casing 146, on its outer periphery, is provided with a lug 152 (Figs. 1, 6 and 7) to which is pivotally connected one end of a link 153, the opposite end of which is pivotally connected to the rearwardly extending arm 154 (Fig. 6) of a yoke member 155. The yoke member 155 (Figs. 6 and 7) is secured to the lower end of a pin 156 that is rotatably mounted in a casing-carried bearing 157. This pin 156 is long enough to project upwardly beyond the bearing 157 where it is fixed to the hub 158 of an arm 159 that projects laterally into engagement with the outer end of a front stem 160 carried by the valve 144 and projecting through the plug opening 143. This arrangement is such that when the casing 146 is rotated counterclockwise by the throttle control shaft 40 in the opening movement of the throttle, the arm 159 is moved forwardly to move the valve stem 160 to unseat the valve 144 against the pressure of a spring 161 thereby connecting the air piston chamber 101 to atmosphere.

The arm 159 is positively positioned not only for pick-up of the valve stem 160, but extent of opening of the valve 144 by adjustable stop screws 162, 163 (Fig. 6) carried by the ends of the arms 164, 165 of the yoke member 155. The extent of opening of the valve 144 will, obviously, determine, in part, the amount of pressure variation within the air piston chamber 101, and the stop screws 162, 163 can be so adjusted as to open this chamber to atmosphere to an extent to produce the desired mixture strength for acceleration purposes.

Rotation of the dash-pot structure 145 by the control shaft 40 to provide for the foregoing valve operation is accomplished as follows: When the dash-pot chamber 148 is filled with the oil or other fluid, the pocket between the control shaft vane 151 and the casing vane 149 is fully filled with the liquid. As the control shaft is rotated in anti-clockwise direction (Fig. 15), the casing 146 being then stationary, there is a tendency for the fluid between the vanes 149 and 151 to be compressed, and this is true regardless of the small relief passage 166 in the vane 149 which is not of such size as to prevent desired build-up of pressure between the vanes in an accelerating movement of the throttle control shaft 40. Consequently, as the throttle control shaft vane 151 is moved in accelerating, the accumulated pressure acting on the casing vane 149 moves the latter and the casing 146 rotatably in counter-clockwise direction to effect movement of the yoke 155 and valve operating arm 159 as above described.

It will be seen that when the casing 146 is thus rotated until the stop 163 prevents further movement of the parts, further relief, in excess of that afforded by the small passage 166, should be provided to accommodate any further movement of the throttle control shaft 40 and the vane 151. To this end, the casing vane 149 is provided with another relief opening 167 normally closed by a valve 168 urged into seated position by a spring 169. The valve 168 is provided with a stem 170 that finds guidance and support in an adjustable plug 171 carried by the dash-pot casing 146. When the pressure between the vanes becomes great enough, as when the stop 163 engages the casing 51ª to prevent further opening of the valve, the continued movement of the vane 151 (and increased pressure) will unseat the valve 168 and relieve the pressure between the vanes. However, when the throttle opening movement is discontinued, the fluid compressed between the vanes will be relieved through the small relief passage 166, and also past the valve 168 if the pressure is great enough, so that the pressure throughout the casing (and between the vanes 149 and 151) is restored to equality, this being aided by the opening 172 in the vane 151 which is controlled by the check valve 173 in a manner which will be well understood. As this equalization takes place and the pressure acting on the valve operating arm 159 through the dash-pot connections is relieved, the spring 161 acting on the valve 144 gradually moves such valve toward its closed position and, in turn, the dash-pot casing gradually back to its normal position independently of the position of the throttle control shaft; thereby restoring this structure for a subsequent acceleration should the operator desire to accelerate again.

Great promptness in starting under all weather conditions is provided with a much lesser initial fuel supply than in prior (and particularly carburetor equipped) engines. This is accomplished by provision of means insuring sufficient richness of mixture under starting conditions. This is also aided, in part, by so feeding the fuel that it is admitted immediately and directly into the combustion chambers instead of first accumulating in an intake manifold, and the like. To this end, I employ the valve 109 which I may term a starting control valve. This valve serves to fully connect or partially connect or fully disconnect the pipe 108 (Fig. 7) (and air intake pipe) from the chamber 101 above the air piston 100.

More particularly, the valve 109 is mounted in the upper casing section 51ª adjacent the upper part of the chamber 101. It is connectible to the chamber 101 through a casing port 181, it is connectible to atmosphere through a casing port 182 and it is connectible to the air intake pipe through a casing port 183. This valve 109 is of a three-way type having a diametrical port 184 which is adapted in one position to connect the air intake port 183 with the port 181 leading into the chamber 101, at the same time, cutting off the atmospheric connection 182. In another position in which the valve is rotated substantially 90°, the atmospheric port 182 is connected through the ports 184 and 185 to the port 181 leading to the chamber 101 while the air intake port 183 is cut off as will be obvious from Fig. 7. Under normal operating conditions after the engine is started, with the valve 109 in its position of Fig. 7, the chamber 101 above the air piston 100 is connected only to the air intake pipe 34 through the pipe 108. However, in starting the engine, the valve 109 is first rotated clockwise approximately 90° through its operating lever 186 and the flexible operating wire 187 (under the control of an operator) to connect the chamber 101 to atmosphere through the ports 181, 185, 184 and 182, cutting out the air intake pipe connection 108. When the valve 109 is moved to this latter position, the pressure above the air piston becomes atmospheric and such piston is moved immediately to its lowermost position wherein the rise of the fuel cam 81 is highest to pump a greater amount of fuel. This increase in fuel, as hereinabove more particularly described, causes an enrichment of the mixture such as desired for starting purposes. The throttle 35 may be only partially opened at this time but the full capacity of fuel is being fed to the engine. This condition, for best operation, should exist only until the engine is started, after which the valve 109 may be returned to its normal position (Fig. 7) wherein the air piston 100 is again connected only to the air intake pipe.

As is well known, after the engine is started, it is often desirable in cold weather to partially "choke" the engine until it is properly warmed up and operating smoothly. I accomplish this same feature in carrying out my invention by extending the valve ports 184 and 185 in the manner illustrated in Fig. 7 so that when the valve 109 is moved part way between its two extreme positions, the air piston 100 will be connected through somewhat restricted ports to both atmosphere and the engine air intake pipe, thereby causing the air piston to move to a slightly greater lift position to supply more fuel than would be the case if the pressure acting on the air piston were only that of the intake air. This causes the feeding of a slightly enriched mixture over that required by the air being fed to the engine for production of the normal mixture proportions at the particular position of the throttle.

Also, under extreme cold weather starting conditions, it may be desirable to prime the engine to facilitate ready starting. This is accomplished, in carrying out my invention, in a highly efficient manner by supplying an additional amount of raw fuel for each cylinder prior to or during the starting operation, or both. Each cylinder is given an equal amount of priming fuel so that all cylinders will tend to operate under the same identical conditions with the result that, even under the coldest weather conditions, a substantially instantaneous starting operation is accomplished.

I attain the foregoing by the use of a pump device, which is adapted to force an additional amount of fuel through the pumps 50 into the fuel chamber 130 independently of pump operation and also independently of the position of the fuel cam 81. More particularly, I may employ a pump device in the form of a well known form of bulb 190 located conveniently to the engine operator for manual manipulation in a conventional manner. This bulb is connected to the top of the pump fuel chamber 52 by a pipe 191 and a suitable connection 192 (Figs. 3 and 7). The bulb 190 may have the usual check valve (not shown) at its rear end so that upon collapsing of the bulb, the check valve will close and the air pressure acting on the fuel end chamber 52 will be increased a predetermined amount. As this pressure increase takes place, fuel is forced from the chamber 52 past the several pumps 50 into the respective pipes 66 leading to the cylinders and finally into the fuel chambers 130. The amount of fuel thus forced past the pump is the same for each cylinder, thereby making available for each cylinder, without cranking or starting operation, an additional and equal amount of fuel for priming purposes.

When the bulb 190 is released and permitted to return to its normal condition of Fig. 3, the pipe 191 and the space above the fuel in the chamber 52 is again connected to atmosphere since the bulb check valve (not shown) assumes an unseated condition as is usual in devices of this character. It will be understood that I have shown a bulb form of pump merely to facilitate description of my invention, and I do not desire to be limited to the same for carrying out the foregoing operation since it will be clear that any suitable pump structure controlled in any suitable manner during the starting operation may well be employed for increasing the pressure on the fuel for added priming supply.

Various modifications may be resorted to, one of which is illustrated in Figs. 18 and 19. In these figures I have illustrated a six-cylinder engine, but the modification is not limited thereto or to any particular number of cylinders. In this form, the idea of intake passage freedom is carried forwardly still further to the end that there will be assurance that the cylinders will take the maximum possible charge weight at full load. This is accomplished, in part, by arranging the air intake passage or passages so that the air is taken directly from the outside atmosphere at atmospheric temperature, rather than from the engine hood space at under-hood temperatures. Consequently, this form of my invention is quite useful when fuels having initial boiling points as low, for example, as 90° to 95° F., are employed. When employing fuels of this character it is highly desirable, for maintenance and complete control of the fuel supply under the condition of small quantity feed at low engine speed (idling), that the fuel pump unit and the discharge tubes or passages leading from the pump unit be not subjected to temperatures as high as those often obtaining under the ordinary automobile hood in hot weather. In the use of this modification, fuels falling within the above specifications are satisfactorily handled, with no irregularities due to vapor formation.

Generally, with respect to Figs. 18 and 19, to satisfy the volatility characteristics of the fuel, the engine air supply is taken at atmospheric temperature through an air intake pipe 200 connecting with atmosphere as at 201 through the hood wall 202. This intake may be located at any position most expedient for the purpose and the air passage leading therefrom is of such character that the fuel pump assembly is enclosed within the supply passage so that the fuel system is swept by the in-going and relatively cool air aspirated by the engine.

A throttle valve 203 is mounted in the intake pipe 200 and it may be controlled in the manner in which the throttle valve 35 of the previous form is controlled. The air intake passages leading from the throttle valve 203 is branched at 204, 205 and 206 from an enlarged central portion 207 providing corresponding air supply branches leading to each siamesed pair of intake valves, respectively, numbered 208—209, 210—211 and 212—213 (Fig. 18). A pump unit 214 similar to that shown in Figs. 5, 7, 8, 10 and 11 is located in the enlarged central space 209. The fuel pump unit is preferably located entirely within the air passage 207 so that it is swept by the ingoing cool air, and this is also true of the several fuel discharge pipes or tubes 215 leading from the enclosed pumps 216 to the fuel chambers 217 located adjacent the intake valves 208—213 (Fig. 19). With this arrangement, all of the fuel and/or supply parts of the structure, are subject to the cooler air and fuels with higher volatility characteristics may be employed with the desired high efficiency, and uniformity in engine operation. It is to be understood that this particular arrangement also operates with high efficiency in the use of other fuels.

Referring to Fig. 19, it will be seen that a relatively small nozzle 218 is employed at the discharge end of each of the fuel pipes 215 for delivery of the fuel into the chambers 217, instead of a weighted check valve structure such as employed in the first-described form and illustrated in Fig. 11. I have found that the weighted check valve structure may be eliminated and the restricted nozzle or fine jet device 218 only may be employed. Such nozzles or jets, as demonstrated in practice, serve to provide the necessary resistance to flow to stabilize the pump discharges against the inertia forces in the columns of fuel in the fuel discharge tubes 215. The use of these fine nozzles or jets, while providing adequate resistance to fuel discharge make vapor lock conditions impossible. However, when using less volatile fuels or other fuels under lower temperature conditions, the spring-weighted check valve arrangement illustrated in Fig. 11 well serves the purpose. Other than just described, the construction and operation of the form of Figs. 18 and 19 is substantially the same as that of the previously-described form.

It will be appreciated by reference to Figs. 20 and 21 that my invention is not limited to the supply of fuel through the intake valve seat. More specifically, the fuel may be fed to the combustion chamber 220 (Fig. 20) above the intake valve 221 through a discharge control unit 222. This unit takes the form of a hollow plug-like member 223 screwed into the cylinder head 224 directly above the intake valve 221. The fuel pumps are connected to this hollow plug structure by a pipe 225 which is, in turn, connected to the plug 223 by a union member 226 having a passage 227 therein discharging into the lower part of the hollow plug through a restricted nozzle 228 similar to the nozzle 218 of the form of Fig. 19. The power part of the plug 223 is provided with a bushing 229 forming a fuel chamber 230 corresponding to the fuel chambers 130 and 217 of the previous forms. The lower part of the plug 223 is provided with a relatively small passage 231 discharging directly into the combustion space 220, communication between the fuel chamber 230 and the passage 231 being controlled by a square-like check valve 232 similar to the previously described pump check valves. In the normal operation of this structure, fuel is fed through the pipe 225 and nozzle jet 228 into the fuel chamber 230 similarly to the feed of fuel into the fuel chamber 130 of the form of Fig. 1. The fuel is fed prior to the time of the beginning of the intake stroke of the engine, at which time the pressure in the combustion space (as will be well understood) is such as to hold the check valve 232 seated against the bottom of the chamber 230 and seal the fuel therein against delivery into the combustion chamber. However, when the intake stroke begins the check valve 232 is drawn from its seat downwardly, readily permitting the fuel to be drawn therepast into the combustion space. The suction of the engine acting on this fuel sweeps the chamber 230 clear of all fuel by the time the intake stroke is completed, and the remainder of the operation of the structure is identical with that already described in connection with the form of Fig. 1.

If desired, the fuel discharge may be controlled by a horizontally-disposed unit such as shown in Fig. 21. This arrangement is similar to that illustrated in Figs. 1 and 19 except that a plug unit 240 is screwed horizontally into a suitably-provided opening in the cylinder head 241. This plug is provided with a nozzle portion 242 having a discharge passage 243 leading directly into the combustion space 244. In this arrangement, I also employ a fuel chamber 245 that may be similar to the fuel chamber 217 into which the fuel pipe 246 (leading from the pump) discharges through a restricted jet member 247. Communication between the nozzle discharge passage 243 and the chamber 245 is controlled by a square-like check valve 248 similar to the check valve 232, which check valve is adapted to seat against the inner end of a hollow bushing 249 suitably secured within the plug in communication with the chamber 245 by a threaded portion 250. The operation of this structure is quite similar to that of the form of Fig. 20. That is, except on the intake stroke of the engine, the check valve 248 is held seated against the inner end of the bushing 249 cutting off communication between the fuel chamber 245 and the discharge nozzle passage 243. While this condition exists, the pump operates in the manner already described. It forces the fuel through the pipe 246 and jet device 247 into the chamber 245 so that, when the intake valve 251 is opened, the check valve 248 is unseated and the chamber 245 is swept clear of the liquid fuel deposited therein by the pump.

It is believed that the operation and advantages of my invention will be obvious from the foregoing. It is also to be understood that while I have shown different forms of structure embodying my invention, other changes in details and arrangements of parts may be made without departing from the spirit and scope of my invention as defined by the claims that follow.

I claim:

1. In a fuel supply system for internal combustion engines, means providing an air intake passage leading to the several engine cylinders, an air intake valve between said passage and each cylinder, a throttle valve in said passage, a fuel pump for each cylinder for delivering equal measured amounts of fuel to each cylinder, a pump operating device adjustably controlled by the pressure in said passage for varying the fuel feed capacity of all said pumps to similar extent as the intake air pressure is varied, and mechanism operative at different engine loads for controlling the normal adjustment of said pump operating device by the intake air pressure for varying the fuel feed capacity of said pumps disproportionately to the variation in intake air pressure to provide a richer mixture upon predetermined reductions in intake air pressure than would otherwise be supplied under the normal control of said pump operating device by the then existent intake air pressure.

2. In a fuel supply system for internal combustion engines, means providing an intake air passage leading to an engine cylinder, an air intake valve controlling admission of air from said passage into the cylinder, a throttle valve in said passage, pump means for delivering charges of fuel to the cylinder for admixture with the intake air when said intake valve is opened, a rotatable device shiftable under the control of the pressure in said intake passage for actuating said pump means, said device being shiftable in a direction to reduce the amount of the fuel charge when said throttle valve is moved toward its closed position and the pressure in the intake passage is reduced, and vice versa when said throttle valve is moved toward its open position and the pressure in the intake passage is increased, and means opposing and retarding the shift movement of said device by the intake air pressure as said throttle valve is moved toward its closed position for variation in fuel charge amount and mixture proportions.

3. In a fuel supply system for internal combustion engines, means providing an intake air passage leading to an engine cylinder, an air intake valve controlling admission of air from said passage into the cylinder, a throttle valve in said passage, pump means for delivering charges of fuel to the cylinder for admixture with the intake air when said intake valve is opened, a rotatable device shiftable under the control of the pressure in said intake passage for actuating said pump means, said device being so constructed and arranged that by shifting it in one direction the amount of the fuel charge is reduced, and vice versa, when it is shifted in an opposite direction, and means effective at different intake air pressures and under all engine load conditions for variably opposing and retarding the shift movement of said device as said throttle valve is moved toward its closed position to vary the fuel charge amount and mixture proportions to bring the latter within predetermined proportions throughout the load range of the engine.

4. In a fuel supply system for internal combustion engines of the multi-cylinder type, means for supplying air to the cylinders including intake valves controlling admission of air into the cylinders and throttle valve means, a pump means for each cylinder for delivering charges of fuel to the latter for admixture with the intake air when said intake valves are opened, a rotatable device so constructed and arranged that it is common to and operates all said pump means to feed equal measured amounts of fuel to all cylinders, said device being shiftable in one direction under the control of the intake air pressure to reduce in equal amount the amount of the fuel charge delivered to each cylinder when said throttle valve means is moved toward a closed position and the intake air pressure is reduced, and vice versa when said throttle valve means is moved toward an open position and the intake air pressure is increased, and means opposing and retarding the shift movement of said device by the intake air pressure as said throttle valve means is moved toward closed position to vary the fuel charge amount and mixture proportion to provide predetermined mixture proportions at successive points throughout the engine load range.

5. In a fuel supply system for internal combustion engines of the multi-cylinder type, air intake passage means leading to the cylinders, air intake valve means controlling admission of air from the intake air passage into the cylinders, throttle valve means controlling the intake air, pump means for delivering charges of fuel to all cylinders in equal amount for admixture with the intake air when said intake valve means is opened, a device for actuating all said pump means to similar extent, said device being shiftable in one direction by the intake air pressure to reduce the amount of fuel charge when the throttle valve means is moved toward closed position and the intake air pressure is reduced, and vice versa when the throttle valve means is moved toward its open position and the intake air pressure is increased, and means successively effective to oppose the shift movement of said device as said throttle valve means is moved toward its closed position to vary the fuel charge amount required to meet predetermined variations in mixture proportions at successive points throughout the engine load range.

6. In a fuel supply system for internal combustion engines, means providing an intake air passage, a valve controlling admission of air from said passage to the cylinder, a throttle valve controlling admission of air to said passage, and means for feeding fuel to the cylinder for mixture with air from said passage, which means includes a pump having a plunger, a rotatable and axially shiftable and variable rise cam member for reciprocating said plunger to deliver a charge of fuel, the rise of said cam member being substantially uniform from one end thereof to the other end so that with the cam member at one axial limit said plunger is moved with greatest stroke and as said cam member is shifted uniformly toward its other axial limit said plunger is moved with progressively shorter strokes to supply less fuel, and vice versa, engine-actuated means for rotating said cam member, and means connected to said intake passage between the engine and said throttle valve for shifting said cam member as the pressure in said intake passage varies.

7. In a fuel supply system for internal combustion engines, means providing an intake air passage, means controlling the admission of air to said passage and from said passage to the cylinder, and means for feeding fuel to the cylinder for mixture with air from said passage, which means includes a reciprocable pump member, a rotatable and axially shiftable and variable rise cam member which through its rotational movement reciprocates said pump member to deliver a charge of fuel, the rise of said cam member being substantially uniform from one end thereof to the other end so that with the cam member at one axial limit said pump member is moved with greatest stroke and as said cam member is shifted toward its other axial limit, said pump member is moved with progressively shorter strokes to supply less fuel, and vice versa, means forming a pressure chamber connected to said intake air passage, a piston operable in said pressure chamber and reciprocable therein by variation of the pressure therein, means connecting said piston to said cam member to shift the latter as said piston is shifted, and independent means for rotating said cam member to actuate said pump member independently of the extent of shift of said cam member.

8. In a fuel supply system for internal combustion engines of the multi-cylinder type, intake air passage means leading to the cylinders, intake air valves controlling admission of air from said passage means to the cylinders, throttle valve means controlling admission of air to said passage means, and means for feeding fuel to the cylinders in equal measured amount for mixture with air from said passage means, which means includes a plurality of pumps, one for each cylinder, each having a reciprocable plunger, a rotatable and axially shiftable cam member constantly engaged with corresponding ends of all of said plungers for reciprocating the latter to deliver fuel charges, said cam member being axially shiftable at substantially right angles to the axes of said plungers and being of a variable rise character whereby at one limit of its axial shift movement such plungers are moved with their longest stroke and the greatest amount of fuel is fed and, as said cam member is shifted toward its other axial shift movement limit, said plungers are operated with progressively shorter strokes to feed uniformly decreasing amounts of fuel, and vice versa, means forming a pressure chamber adapted normally to be connected to the intake air passage, a piston operable in said pressure chamber and connected to said cam member and adapted to shift said cam member axially in response to variation in pressure in said intake passage, and independent means for rotating said cam member to actuate all of said plungers.

9. In a fuel supply system for internal combustion engines of the multi-cylinder type, means providing intake air passages leading to the cylinders, intake air valves controlling admission of air from said passages to the cylinders, throttle valve means controlling admission of air to said passages, and means for feeding fuel to the cylinders in equal measured amount for mixture with air from said passages, which means includes a plurality of pumps, one for each cylinder, each having a reciprocable plunger, a rotatable and axially shiftable cam member engageable with corresponding ends of all of said plungers for reciprocating the latter to deliver fuel charges, said cam member being axially shiftable at substantially right angles to the axes of said plungers and being of a variable rise character whereby at one limit of its axial shift movement such plungers are caused to take their longest stroke and feed the greatest amount of fuel and as said cam member is shifted toward its other axial limit, said plungers are operated with progressively shorter strokes to feed uniformly decreasing amounts of fuel, and vice versa, means forming a pressure chamber adapted normally to be connected to the intake air passage, a piston operable in said pressure chamber and connected to said cam member and adapted to shift said cam member axially in response to variation in pressure in said intake air passage, and means located in said pressure chamber and variably opposing at different engine loads movement of said piston to control movement thereof under the influence of the intake air pressure to vary the normal shift movement of said cam member and the amount of fuel fed disproportionately to the variation in intake air pressure for meeting predetermined and optimum mixture proportions requisite for the existent engine loads.

10. In structure of the class described, means providing a substantially free and unrestricted intake air passage, an intake valve connecting said passage to an engine cylinder, a throttle valve in said passage, and fuel feeding means comprising a pump having a member reciprocable for feeding fuel charges, a rotatable cam member engaged with said reciprocable pump member and axially shiftable for reciprocating said pump member with a stroke variable uniformly between maximum and minimum stroke limits to deliver fuel charges, means forming a pressure chamber, means connecting said chamber to said intake air passage, a piston in said pressure chamber shiftable therein as the intake air pressure is varied, means connecting said piston to said cam member to shift the latter as the intake air pressure is varied, and spring means in said pressure chamber acting on said piston and operative at different intake air pressures to control movement of the latter and said cam member as the intake air pressure is reduced predetermined extents, whereby the rate of decrease in amount of fuel fed upon decrease in intake air pressure is less than the directly normal rate proportionate to reduction in intake air pressure.

11. In structure of the class described, means providing a substantially free and unrestricted intake air passage, an intake valve connecting said passage to an engine cylinder, a throttle valve in said passage, and fuel feeding means comprising a pump having a member reciprocable for feeding fuel charges, a rotatable cam member engaged with said reciprocable pump member and axially shiftable for reciprocating said pump member with a stroke variable uniformly between maximum and minimum stroke limits to deliver fuel charges, means forming a pressure chamber, means connecting said chamber to said intake air passage, a piston in said pressure chamber shiftable therein in one direction as the intake air pressure is reduced and shiftable in the opposite direction as the intake air pressure is increased, means connecting said piston to said cam member for shift movement of the latter, and spring means in said pressure chamber successively and cumulatively acting on said piston to oppose and retard movement of the latter and said cam member as the intake air pressure is reduced to predetermined extents to feed a greater amount of fuel than would otherwise be fed under the direct control of the intake air pressure to provide air and fuel mixture proportions following a predetermined mixture ratio scale.

12. In a fuel supply system for internal combustion engines, means forming a throttle-controlled air intake passage, and means for feeding fuel for admixture with air from the intake passage which includes a fuel reservoir, a pump member reciprocable in one direction for feeding fuel from said reservoir to the engine cylinder in a positively determined amount per engine cycle, a rotatable and variable rise cam member for reciprocating said pump member to feed fuel and shiftable in a path at substantially right angles to the path of reciprocation of said pump member to vary the length of reciprocation of the latter, and, in turn, the amount of fuel fed per engine cycle, a piston member connected to said cam member, means connecting said piston to said intake passage whereby said piston and cam member are shifted according to variation in pressure in said intake passage, and means operative upon predetermined reductions in intake air pressure for controlling movement of said piston as the pressure in said intake passage is reduced, whereby a greater amount of fuel is fed than would otherwise be fed under the direct control of the intake air pressure for providing proper mixture ratios throughout the entire engine load range.

13. In a fuel supply system for internal combustion engines, means forming a throttle-controlled air intake passage, and means for feeding fuel for admixture with air from the intake passage which includes a fuel reservoir, a pump member reciprocable in one direction for feeding fuel from said reservoir to the engine cylinder in a positively determined amount per engine cycle, a rotatable and variable rise cam member for reciprocating said pump member to feed fuel and shiftable in a path at substantially right angles to the path of reciprocation of said pump member to vary the length of reciprocation of the latter and, in turn, the amount of fuel fed per engine cycle, a piston member connected to said cam member, means connecting said piston to said intake passage whereby said piston and cam member are shifted according to variation in pressure in said intake passage, variable load spring means increasingly opposing normal movement of said piston as the pressure in said intake passage is reduced, and means independent of said shift means for rotating said cam independently of its shift movement.

14. In a fuel supply system for internal combustion engines, means forming a throttle-controlled air intake passage, and means for feeding fuel for admixture with air from the intake passage which includes a fuel reservoir, a pump member reciprocable in one direction for feeding fuel from said reservoir to the engine cylinder in a positively determined amount per engine cycle, a rotatable and variable rise cam member for reciprocating said pump member to feed fuel and shiftable in a path at substantialy right angles to the path of reciprocation of said pump member to vary the length of reciprocation of the latter and, in turn, the amount of fuel fed per engine cycle, a piston member connected to said cam member, means connecting said piston to said intake passage to shift said piston and cam member as the pressure in said intake passage is varied, a plurality of springs adapted to be engaged successively by said piston as it is moved by reduction in pressure in said intake passage to successively and increasingly retard movement of said piston to vary the amount of fuel fed per cycle to meet predetermined mixture proportions through the engine load range, and means independent of said cam member shifting structure for rotating said cam member.

15. In a fuel supply system for an internal combustion engine having a throttle-controlled intake passage, means for feeding fuel to an engine cylinder in measured amount variable to satisfy predetermined mixture proportions substantially throughout the load range of the engine, which comprises fuel pump means including a pump actuating member shiftable from a maximum to a minimum charge feeding position as pressure in the air intake passage is reduced from the maximum toward the minimum, a pressure responsive device connected to said air intake passage for shifting said pump actuating member, and a plurality of springs opposing shift movement of said pressure device as the air intake pressure is reduced, there being one spring engaged with and singly opposing movement of said pressure device when the air intake pressure is at the maximum and until it is reduced to a predetermined point, a second spring that is engaged with said pressure device when said first predetermined point in reduction of intake air pressure is reached and which together with said first spring opposes movement of said pressure device while the intake air pressure is reduced to a second predetermined point, a third spring that is engaged with said pressure device when the intake air pressure is further reduced and which with said first two springs opposes movement of said pressure device while the intake air pressure is reduced toward the minimum intake air pressure condition, and means for rotating said pump actuating member independently of said pressure responsive shifting device.

16. A fuel supply system for an internal combustion engine, means for feeding fuel to an engine cylinder which comprises a main fuel chamber normally connected to atmosphere, a fuel charge chamber constantly open to atmosphere and located in close proximity to the engine cylinder, a comparatively small and short port means leading from said charge chamber directly to the engine cylinder, a fuel pump associated with said main fuel chamber and adapted to feed a charge of fuel into said charge chamber during each engine cycle and prior to the beginning of the intake stroke thereof, which charge is swept from said charge chamber on the intake stroke of the engine, directly into the cylinder, and means for operating said pump to deliver a charge during each engine cycle.

17. A fuel supply system for an internal combustion engine having intake valves controlling admission of fuel and air to the cylinders, means for feeding fuel to an engine cylinder which comprises a main fuel chamber normally connected to atmosphere, a small fuel charge chamber open to atmosphere and located in close proximity to the engine cylinder, a comparatively small and short port means leading from said charge chamber and having its discharge end opened and closed by an intake valve, a fuel pump associated with said main fuel chamber and adapted to feed a charge of fuel into said charge chamber during each engine cycle, which charge is fully swept from said charge chamber into the cylinder upon opening of the intake valve on the intake stroke of the engine, and means for operating said pump, said means being shiftable by variation in pressure of the engine intake air to vary the amount of fuel fed to said charge chamber, and means responsive to said pressure for shifting said pump operating means.

18. A fuel supply system for internal combustion engines having controlled intake air means, which includes fuel feeding means comprising a constant level fuel reservoir adapted to be located in close proximity to the engine, a comparatively small fuel charge chamber adapted to be located in close proximity to the engine cylinder and connected to the latter by a comparatively short and small passage, a fuel pump having a fuel inlet port connected directly to said fuel reservoir and a discharge port connected directly to said charge chamber, the charge chamber being open to atmosphere to disconnect said pump from the suction of the engine, means for operating said pump in predetermined time relation with respect to the intake stroke of the engine, and means adapted to vary the operation of said pump operating means to vary the amount of fuel fed to said charge chamber for each charge.

19. A fuel supply system for internal combustion engines having controlled intake air means, which includes fuel feeding means comprising a main fuel chamber, a charge chamber directly associated with the engine cylinder and fully open to the atmosphere, a pump between said two chambers for feeding a measured quantity of fuel from the fuel chamber to the charge chamber during each engine cycle, and means controlled by the pressure of the engine intake air for causing the pump to feed variable size charges of fuel to said fuel chamber as the intake air pressure is varied, the arrangement being such that fuel previously delivered to said charge chamber is swept clear thereof on the intake stroke of the engine.

20. A fuel supply system for internal combustion engines, which comprises means providing a comparatively small and constant level fuel chamber adapted to supply fuel for all cylinders, means providing a comparatively small fuel charge chamber for each cylinder which is immediately and directly connected to the latter through the intake thereof, a fuel pump device for each cylinder between said fuel chamber and each charge chamber, means for operating said pump devices to feed equal measured amounts of fuel to each charge chamber, said pump operating means being adapted to complete the feeding of each charge to the respective charge chamber prior to completion of the respective intake stroke of the engine, said charge chambers being connected to a fluid pressure higher than that existent in the respective engine cylinder so that each charge chamber is swept clear of the fuel therein on the respective intake stroke of the engine independent of the remainder of the fuel feeding structure.

21. In a fuel supply system for internal combustion engines, the combination with means forming an intake air passage, an intake valve controlling communication between the intake passage and a cylinder and adapted to be opened on the engine intake stroke and closed at other times, and a throttle valve in said intake passage, of fuel feeding means including a main fuel chamber, a fuel charge chamber fully open to the atmosphere and located in close proximity to said intake valve and connected to the engine cylinder past said intake valve by a comparatively short and small port, means for feeding a measured quantity of fuel from said main chamber to said charge chamber, beginning at a time prior to the beginning of the engine intake stroke and ending prior to the end of the intake stroke so that said charge chamber is swept clear of fuel through said port and past said intake valve on the intake stroke.

22. In a fuel supply system for internal combustion engines having an intake air passage controlled by a throttle valve, pump means for feeding fuel to a cylinder, means connected to said intake passage and controlled by the pressure therein for actuating said pump means to feed greater or lesser amounts of fuel as the intake air pressure is varied, throttle valve operating mechanism, and means for automatically connecting said pump actuating means to atmospheric pressure for feeding a greater amount of fuel than would otherwise be fed under the control of the existent intake air pressure as said throttle operating mechanism is actuated for increased throttle opening.

23. In a fuel supply system for internal combustion engines having intake air passages leading to the several cylinders and throttle valve means for opening and closing the intake air passages, means for feeding equal measured amounts of fuel to all cylinders including a pump device for each cylinder and a pump actuator simultaneously operating all said pump devices, means connected to said intake passage and controlled by the pressure therein for adjusting said actuator to feed greater or lesser amounts of fuel to each cylinder, in equal measured amounts, means for operating said throttle valve means, and means operative under throttle opening movement of said throttle valve operating means for connecting said actuator adjusting means to a pressure greater than said intake pressure for adjustment of said actuator to feed a greater amount of fuel, in equal measured amount to each cylinder, than normally fed under the then-existent intake air pressure.

24. In a fuel supply system for internal combustion engines having an intake air passage controlled by a throttle valve, pump means for feeding fuel to a cylinder including a reciprocable pump plunger and a variable rise cam rotatably engaged with said plunger with its axis of rotation at substantially right angles to the path of reciprocation of said plunger, said cam being axially shiftable while engaged with said plunger to reciprocate the latter to feed greater or lesser amounts of fuel during each plunger reciprocation, a pressure chamber, a piston in said chamber connected to said cam, means for connecting said chamber to said intake passage whereby increase and decrease of pressure in said intake passage by opening and closing said throttle valve shifts said piston and cam to feed greater or lesser amounts of fuel, means for opening and closing said throttle valve, and means operable by the opening movement of said throttle valve operating means for connecting said pressure chamber to atmosphere to shift said piston and cam to feed a greater amount of fuel than would otherwise be fed under the control only of the then-existent intake air pressure.

25. In a fuel supply system for internal combustion engines having an intake air passage controlled by a throttle valve, pump means for feeding fuel to a cylinder, means connected to said intake passage and controlled by the pressure therein for actuating said pump means to feed greater or lesser amounts of fuel as the intake air pressure is varied, throttle operating mechanism, and means for automatically connecting said pump actuator means to atmospheric pressure for feeding a greater amount of fuel than would otherwise be fed under the control of the existent intake air pressure as said throttle operating mechanism is actuated for increased throttle opening, said latter means including a valve between said pump actuating means and atmosphere, and structure for opening and closing said valve including a dash-pot movable from a normal position when said throttle valve operating means is given an opening movement to open said valve and self-returnable to its normal position to close said valve when said throttle opening movement is discontinued.

26. In a fuel supply system for internal combustion engines having an intake air passage, pump means for feeding fuel to a cylinder including a reciprocable pump plunger and a variable rise cam rotatably engaged with said plunger with its axis of rotation at substantially right angles to the path of reciprocation of said plunger, said cam being axially shiftable while engaged with said plunger to reciprocate the latter to feed greater or lesser amounts of fuel during each plunger reciprocation, a pressure chamber, a piston in said chamber connected to said cam, means for connecting said chamber to said intake passage whereby increase and decrease of pressure in said intake passage by opening and closing said throttle valve shifts said piston and cam to feed greater or lesser amounts of fuel, means for opening and closing said throttle valve, and means operable by the throttle opening movement of said throttle valve operating means for connecting said pressure chamber to atmosphere and to shift said piston and cam to feed a greater amount of fuel than would otherwise be fed under the control only of the then-existent intake air pressure, said latter means including a spring-pressed valve controlling a connection between said pressure chamber and the atmosphere, a valve operating member, a dash-pot device connected to said throttle valve control means and movable from a normal position with the latter when the latter is moved with an accelerating motion to actuate said valve operating member to open said valve, said dash-pot being so constructed and arranged that it is adapted to return to normal position under the influence of said valve when said throttle opening motion is discontinued to return said piston to the direct control of the intake air pressure.

27. In a fuel supply system for internal combustion engines having an intake air passage controlled by a throttle valve, pump means for feeding fuel to a cylinder, means connected to said intake passage and controlled by the pressure therein for actuating said pump means to feed greater amounts of fuel for mixture enrichment as the intake air pressure is increased by opening movement of said throttle valve and to feed lesser amounts of fuel as the intake air pressure is reduced by closing movement of said throttle valve, throttle valve operating mechanism, and means for disconnecting said pump actuating means from the intake passage and for connecting it to atmosphere for feed of maximum amount of fuel for starting purposes.

28. In a fuel supply system for internal combustion engines having an intake air passage controlled by a throttle valve, pump means for feeding fuel to a cylinder, means connected to said intake passage and controlled by the pressure therein for actuating said pump means to feed greater or lesser amounts of fuel as the intake air pressure is varied, throttle valve operating mechanism, and means for disconnecting said pump actuating means from the intake air passage and for connecting it to atmosphere for feed of maximum amount of fuel for starting purposes, said latter means also being adjustable to partially connect said pump actuating means simultaneously to both said intake air passage and to atmosphere for feed of a greater amount of fuel than would otherwise be fed under the control solely of the then-existent intake air pressure.

29. In a fuel supply system for internal combustion engines having an intake air passage leading to a cylinder, a throttle valve for varying the pressure in said passage, and throttle valve operating means; means for feeding a measured quantity of fuel to the cylinder during each cycle of operation, means operable under the control of the intake air pressure for adjusting said fuel feed means to feed greater or lesser amounts of fuel to the cylinder as the intake air pressure is increased and decreased, and means operative upon throttle opening actuation of said throttle valve operating means for increasing the pressure acting on said fuel feed adjusting means independently of the intake air pressure to feed a greater amount of fuel than would otherwise be fed under the control solely of the intake air pressure.

30. In a fuel supply system for internal combustion engines having means supplying intake air to the several cylinders, throttle valve means associated with said intake air means for controlling the pressure of the intake air, and throttle valve operating means; means for feeding an equal measured quantity of fuel to each cylinder during each cycle of operation, means operable under the control of the intake air pressure for adjusting said fuel feed means to feed greater or lesser equal measured amounts of fuel to each cylinder as the intake air pressure is increased and decreased, and means operative upon throttle opening actuation of said throttle valve operating means for increasing the pressure acting on said fuel feed adjusting means independently of the intake air pressure to feed a greater amount of fuel in equal amounts of each cylinder than would otherwise be fed under the control solely of the intake air pressure.

31. In a fuel supply system for internal combustion engines having an intake air passage means leading to the engine cylinders and throttle valve means for varying the pressure in said passage means, means for feeding an equal measured quantity of fuel to each cylinder during each cycle of operation, means connected to said intake air passage and means normally operable under the control of the intake air pressure between said throttle valve means and the cylinder for adjusting said fuel feed means to feed greater or lesser amount of fuel per cycle in equal measured amount to each cylinder as the intake air pressure is increased or decreased, and means for disconnecting said fuel feed adjusting means from the intake air passage and for connecting said adjusting means to a substantially greater pressure than the then-existent intake air pressure for feed of the greater amount of fuel in equal measured amount to each cylinder for starting purposes.

32. In an internal combustion engine having an air intake passage and throttle valve controlling the pressure in such passage, fuel feeding means for delivering a measured quantity of fuel to a cylinder during each cycle of engine operation, means normally controlled by the pressure in said intake air passage for adjusting said fuel feed means to feed greater or lesser amounts of fuel as the intake air pressure is increased or decreased, a conduit connecting said intake passage to said fuel feed adjusting means, and a valve associated with said conduit and manually adjustable to connect said fuel feed adjusting means to said intake passage only or to atmosphere only, or to both said intake passage and to atmosphere.

33. In a fuel supply system for internal combustion engines, means forming a fuel chamber common to all the cylinders, means forming a comparatively small charge chamber in close proximity to each cylinder, pump means, one for each cylinder, for delivering equal measured charges of fuel to said charge chambers during the operation of the engine, means connecting each said charge chamber to the respective cylinder in such a way that it is swept clear of fuel during each intake stroke of the respective cylinder, and additional pump means adapted to act on the fuel in said fuel chamber independently of said first pump means for forcing fuel past the latter into said charge chambers for increasing the amount of the fuel charge for priming purposes.

34. In a fuel supply system for internal combustion engines, means forming a fuel chamber common to all the cylinders, means forming a comparatively small charge chamber in close proximity to each cylinder, pump means, one for each cylinder, for delivering equal measured charges of fuel to said charge chambers during the operation of the engine, means connecting each said charge chamber directly to the respective cylinder in such a way that it is swept clear of fuel during each intake stroke of the respective cylinder, and manually controlled pump means adapted to apply pressure to the fuel in said fuel chamber independently of said first pump means for forcing fuel past the latter into said charge chambers, in equal measured amount to each cylinder, for increasing the amount of the fuel charge for priming purposes.

35. In a fuel supply system for internal combustion engines, means providing an intake air passage leading to the several cylinders from a point remote from the cylinders and through which air at atmospheric temperature is fed, means providing a fuel chamber located in said passage so as to be bathed by the air therein, fuel pump means located in said passage for feeding fuel to said cylinders from said chamber, and fuel conduits connecting said pump means to said cylinders and passing through said passage to be bathed by the air therein.

36. In a fuel supply system for internal combustion engines, means providing an intake air passage leading to the several cylinders from a point remote from the cylinders and through which air at atmospheric temperature is fed, means controlling the flow of air through said passage, means providing a fuel chamber located in said passage so as to be bathed by the cooler air therein, fuel pump means, one for each cylinder, located in said passage for feeding equal measured amounts of fuel to said cylinders from said chamber, and fuel conduits connecting said pump means to said cylinders and passing through said passage to be bathed by the cooler air therein, the arrangement being such that the fuel and air are initially brought together at the respective cylinder.

37. In a fuel supply system for internal combustion engines having a cylinder and an intake air valve, a fuel reservoir, a charge chamber, means for feeding a measured quantity of fuel to said charge chamber, means providing a passage-way leading from said charge chamber to said intake valve which opens and closes the same, additional means including a valve connecting said charge chamber to the engine cylinder, said latter valve being arranged to open and admit cylinder gases under pressure to said charge chamber when said intake valve is closed, and to close and disconnect said charge chamber from the cylinder when said intake valve is opened.

38. In a fuel supply system for internal combustion engines, means providing an air intake passage leading to an engine cylinder, an air intake valve between said passage and the cylinder, a throttle valve in said passage, a fuel pump for delivering fuel to the cylinder, adjustable pump operating means connected to said intake passage between said intake valve and said throttle valve whereby variation in the intake air pressure adjusts said pump operating means to feed greater or lesser amounts of fuel as the intake air pressure is varied, and mechanism operative at different positions in the engine load range for varying the extent of adjustment of the intake air pressure on said pump operating means, whereby said pump operating means is adjusted to cause said pump means to feed an increased amount of fuel disproportionately to the then-existent intake air pressure upon predetermined reductions in the intake air pressure.

39. In structure of the class described adapted for use with an internal combustion engine, an air intake pipe leading thereto, an air intake valve and a throttle valve in the intake pipe; means for positively feeding the same measured quantity of fuel to each cylinder during each cycle of operation, means connected to the engine for operating said first means to feed fuel, means connected to said intake pipe between said throttle valve and intake valve for adjusting said second means for varying the amount of fuel feed as the intake air pressure varies, and means operable upon predetermined variations in intake air pressure for varying the adjusting effect of the intake air pressure on said third means for varying the proportions of the mixture of fuel and air to cause the feeding of a richer or leaner mixture than would otherwise be fed under the direct control of the air intake pressure.

40. In a fuel supply system for a multi-cylinder engine, means providing intake passages leading to the several cylinders, throttle valves in said intake passages, air intake valves between the cylinders and air intake passages, a fuel pump for each cylinder, means for operating said pumps, which means is adjustable to vary the capacity of each pump similarly, means operable by the pressure in said intake passage for automatically adjusting said first means to vary the amount of fuel fed as the intake air pressure varies, and means altering the operating control of said intake pressure upon said first means upon predetermined decreases in the intake air pressure to retard the decrease in amount of fuel fed disproportionately to the decrease in intake air pressure to provide a predetermined mixture ratio to meet the existent engine load condition.

41. In a fuel supply system for internal combustion engines, means providing an air intake passage leading to an engine cylinder, an air intake valve between said passage and the cylinder, a throttle valve in said passage, a fuel pump, a single means operable to actuate said fuel pump and also adjustable to vary the capacity of said fuel pump, means for operaitng said single means to actuate said fuel pump, and means for adjusting said single means independently of said operating means, which latter adjusting means is connected to said intake passage between the engine and said throttle valve, whereby the adjustment of said single means is accomplished by the intake air pressure.

42. Fuel supply means for an internal combustion engine having a cylinder, an intake passage leading thereto, an intake valve between said passage and cylinder, and a throttle valve in said intake passage, which comprises, a pump member, pump operating means adapted to cause the pump to feed fuel, said pump operating means being shiftable to vary the capacity of said pump, means connecting the pump directly to the engine cylinder, means for driving said pump operating means, and independently operating means connected to said intake passage between said intake valve and throttle valve for shifting said pump operating means to vary the amount of fuel fed independently of said driving means.

43. Fuel supply means for an engine having an intake air passage leading to a cylinder and in which passage there is a throttle valve, which includes, a pump member, pump operating means adapted to cause the pump to feed fuel, said pump operating means being shiftable to vary the capacity of said pump, means connecting the pump directly to the engine cylinder, means for driving said pump operating means, and independently operating means connected to said intake passage between said intake valve and throttle valve for shifting said pump operating means to vary the amount of fuel fed independently of said driving means, said intake air pressure connected means including mechanism effective upon predetermined successive reductions in intake air pressure for successively and increasingly opposing and retarding the shift movement of said pump operating means as the intake air pressure is reduced toward the minimum.

44. In a fuel supply system for internal combustion engines of the multi-cylinder type, air intake passage means leading to the cylinders, air intake valve means controlling admission of air from the intake air passage into the cylinders, throttle valve means controlling the intake air, pump means including a plurality of plungers for delivering charges of fuel to the cylinders in equal amount for admixture with the intake air when said intake valve means is opened, a device for actuating all of said pump plungers to a similar extent, said device being shiftable in one direction by the intake air pressure to reduce the amount of fuel charge when the throttle valve means is moved toward closed position and the intake air pressure is reduced, and vice versa when the throttle valve means is moved toward its open position and the intake air pressure is increased, and a plurality of springs successively effective to oppose the shift movement of said device as said throttle valve means is moved toward its closed position for variation in fuel charge amount required to meet predetermined variation in mixture proportions at successive points throughout the engine load range.

45. A fuel supply system for an internal combustion engine, comprising: means providing an air intake passage leading to an engine cylinder, an air intake valve controlling the admission of air from said air intake passage to said cylinder, pump means for delivering fuel to said cylinder including a plunger and a rotatable cam having a portion thereof in engagement with said plunger shaped to vary the stroke of said plunger upon movement transverse to said plunger; means responsive to the pressure in said air intake passage for shifting said cam transversely to said plunger, and means independent of said last mentioned means for rotating said cam to actuate said plunger.

46. A fuel supply system for an internal combustion engine, comprising: means providing an air intake passage leading to an engine cylinder; an air intake valve controlling the admission of air from said air intake passage to said cylinder; pump means for delivering fuel to said cylinder including a plunger and rotatable eccentric means operatively associated with said plunger for variably actuating said plunger to vary the volume of fuel delivered thereby; means for shifting the position of said rotatable eccentric means relatively to said plunger in response to variations of pressure in said air intake passage; and means independent of said shifting means for rotating said eccentric means to actuate said plunger.

47. A fuel supply system for internal combustion engines of the multi-cylinder type, comprising: a plurality of air intake pipes providing air intake passageways for the cylinders of an engine, an air intake valve for controlling the admission of air to each of said cylinders, a throttle valve in each of said air intake pipes for controlling the passage of air therethrough to said cylinders, common means for simultaneously actuating all of said throttle valves, hollow connecting means intermediate said throttle valves and cylinders establishing communication between said air intake pipes to equalize the pressure therein, pump means driven from the engine for delivering fuel to said cylinders, and means responsive to the pressure of said intake air arranged to vary the supply of fuel delivered to said cylinders by said pump means.

48. A fuel supply system for internal combustion engines of the multi-cylinder type, comprising: a plurality of air intake pipes providing air intake passageways for the cylinders of an engine, a throttle valve in each of said air intake pipes for controlling the passage of air therethrough to said cylinders, hollow connecting means located intermediate said throttle valves and cylinders establishing communication between said air intake pipes to equalize the pressure therein, pump means driven from the engine for delivering fuel to said cylinders, means responsive to the pressure of said intake air for varying the supply of fuel delivered to said cylinders by said pump means, and means establishing communication between said hollow connecting means and said pressure responsive means.

49. In a fuel supply system for internal combustion engines: a cylinder, means providing an air intake passage leading to said cylinder, an intake valve controlling the flow of air from said passage into said cylinder, a throttle valve in said passage, pump means connected with the cylinder for delivering charges of fuel to said cylinder, a device for driving said pump means, said device being arranged and constructed so that upon shifting thereof it will vary the volume of the fuel charges delivered by said pump means, and means operatively associated with said device and controlled by the pressure in said intake passage for automatically shifting the position of said driving device in all positions of said throttle valve to vary the amount of fuel feed whenever the pressure in said intake passage is either increased or decreased.

50. In a fuel supply system for internal combustion engines: a cylinder, means providing an air intake passage leading to said cylinder, means controlling the flow of air from said passage into the cylinder, an adjustable throttle valve in said passage, means connected with the cylinder for delivering charges of fuel to said cylinder, means for actuating said fuel charge delivering means, said actuating means being arranged and constructed so that upon shifting thereof it will vary the amount of fuel feed, and means connected with said air intake passage and controlled by the pressure therein for shifting said actuating means in one direction as the intake pressure is decreased and in the opposite direction when such pressure is increased, said shifting means being shiftable throughout its range of movement in response to variations in intake pressure under all engine load conditions.

PERCIVAL S. TICE.